(12) United States Patent
Harris et al.

(10) Patent No.: US 9,288,396 B2
(45) Date of Patent: Mar. 15, 2016

(54) CAMERA TIMER

(71) Applicant: Apple Inc., Cupertino, CA (US)

(72) Inventors: Elliott B. Harris, San Francisco, CA (US); Jeffrey Brasket, San Francisco, CA (US); Justin S. Titi, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,126

(22) Filed: May 30, 2014

(65) Prior Publication Data
US 2015/0350551 A1    Dec. 3, 2015

(51) Int. Cl.
*H04N 5/232* (2006.01)

(52) U.S. Cl.
CPC ....... *H04N 5/23293* (2013.01); *H04N 5/23216* (2013.01); *H04N 5/23219* (2013.01)

(58) Field of Classification Search
CPC .......... H04N 5/23293; H04N 5/23219; H04N 5/23216; H04N 2101/00; H04N 5/232; H04N 5/23222; H04N 1/00801; H04N 1/00933; H04N 1/2112; H04N 2201/0084; G06K 9/00255; G06K 9/00912; G03B 17/00
See application file for complete search history.

(56) References Cited

U.S. PATENT DOCUMENTS

| | | | |
|---|---|---|---|
| 5,510,831 A * | 4/1996 | Mayhew | 348/47 |
| 5,696,527 A * | 12/1997 | King et al. | 345/634 |
| 6,157,733 A * | 12/2000 | Swain | 382/154 |
| 6,323,914 B1 * | 11/2001 | Linzer | 348/578 |
| 7,301,562 B2 | 11/2007 | Belz et al. | |
| 7,693,408 B1 * | 4/2010 | Tsai | 396/79 |
| 7,990,420 B2 | 8/2011 | Nung | |
| 8,085,318 B2 * | 12/2011 | Ciudad et al. | 348/239 |
| 8,116,539 B2 * | 2/2012 | Nishijima | 382/118 |
| 8,209,635 B2 * | 6/2012 | Thom | 715/863 |
| 8,576,320 B2 * | 11/2013 | Lim | 348/333.04 |
| 8,711,232 B2 * | 4/2014 | Lee | 348/208.4 |
| 8,797,445 B2 * | 8/2014 | Kang | 348/335 |
| 8,847,850 B1 * | 9/2014 | Cho | 345/7 |
| 2002/0191030 A1 * | 12/2002 | Trajkovic et al. | 345/811 |
| 2007/0147769 A1 | 6/2007 | Nagaoka et al. | |
| 2007/0274703 A1 | 11/2007 | Matsuda | |
| 2009/0079844 A1 * | 3/2009 | Suzuki | 348/222.1 |
| 2010/0026830 A1 * | 2/2010 | Kim | 348/222.1 |
| 2011/0018963 A1 * | 1/2011 | Robinson | 348/14.16 |
| 2012/0081592 A1 * | 4/2012 | Lim | 348/333.04 |
| 2012/0162476 A1 | 6/2012 | Onoda | |
| 2013/0215292 A1 * | 8/2013 | Reichelt | 348/239 |
| 2014/0033100 A1 | 1/2014 | Noda et al. | |

OTHER PUBLICATIONS

International Search Report and Written Opinion from PCT Application No. PCT/US2015/026028 dated Sep. 21, 2015.

\* cited by examiner

*Primary Examiner* — Amy Hsu
(74) *Attorney, Agent, or Firm* — Novak Druce Connolly Bove + Quigg LLP

(57) ABSTRACT

Disclosed are devices, systems, methods, and non-transitory computer-readable storage media for displaying useful countdown timers on a media capture device. A media capture device can increase contrast between countdown timer and the video of a scene to be captured by a media capture device and adjust the position and size of a counter displayed on the device based on whether the object is determined to be closer or further than a predetermined threshold distance. Countdown timers can be triggered by detection of objects and gestures.

20 Claims, 26 Drawing Sheets

CAMERA TIMER

BACKGROUND

1. Technical Field

The present disclosure relates to media capture and more specifically to displaying a media capture countdown timer.

2. Introduction

Existing camera timers are insufficient. Standard point-and-shoot cameras as well as sophisticated digital single-lens reflex (DSLR) and top-quality video cameras do not include adequate ways to deliver robust information to the subjects of a scene to be captured concerning when image/video capture will begin.

Additionally, the introduction of front-facing cameras has created new challenges for alerting people that an image is about to be captured. Front-facing camera allow subjects framed in a scene to be captured to see themselves before image/video capture begins. However, there is presently no adequate solution for presenting a countdown timer to the subjects. For example, simple timers are inadequate because they are hard to read from far away and it is hard to see countdown timers if there isn't enough contrast between them and the video of the scene to be captured.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, devices, methods, and non-transitory computer-readable storage media for displaying countdown timers on a media capture device. In some embodiments of the present technology, a processor in a media capture device examines video frame data of a scene to be captured, determines how to increase contrast between the video and a counter element, and increases contrast as a counter approaches expiration.

In some embodiments, increasing contrast involves decreasing the brightness of the displayed scene as the counter approaches expiration while increasing the brightness of the counter as the counter approaches expiration. In some cases, increasing the level of contrast involves increasing a level of transparency of the displayed scene as the counter approaches expiration while increasing a level of opacity of the counter as the counter approaches expiration. Adjusting contrast can also involve adjusting color, sharpness, etc.

Some embodiments of the present technology involve detecting objects in a scene to be captured and determine the distance of an object. For example, the media capture application and devices disclosed herein can detect faces and determine the distance the face is from the device based on the size of the detected face. Using the determined distance, the media device or application can adjust the position and size of a counter displayed on the device based on whether the object is determined to be closer or further than a predetermined threshold distance. The present technology also involves triggering the countdown of a timer. In some embodiments, detection of a face in a scene to be captured triggers a time. Similarly, the detection of an additional face in the face can re-start a timer.

Similarly, some embodiments involve detecting gestures and, based on detected gestures, starting counters, pausing counters, restarting counters, resuming counters, etc. For example, a media capture application and/or a media processor can determine that a face is obscured (e.g. peek-a-boo), pause the timer based on the obscuring event, determine that the face is no longer obscured, and resume or re-start the timer.

Some embodiments of the present technology involve detecting a series of images according to a pre-set timer, facial recognition, gesture recognition, etc. The series of images can be saved and displayed in a collection of images. For example, a collection of n images can be displayed in an n-up strip—like the output of a photobooth.

Also, the disclosed technology can involve capturing a sequence (aka burst) of images over a time related (e.g. slightly before) to the expiration of the counter, storing the sequence of images in a buffer, selecting one or more image from the sequence based on an image quality parameter.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Some embodiments of the present technology involve improved techniques for presenting a countdown timer on a media capture device. The media capture device can include a digital display that can display live, captured video (e.g. a series of images displayed captured and displayed at a chosen frame rate) and a media capture graphical user interface (GUI) bordering and/or overlaying the video.

Figure 1:
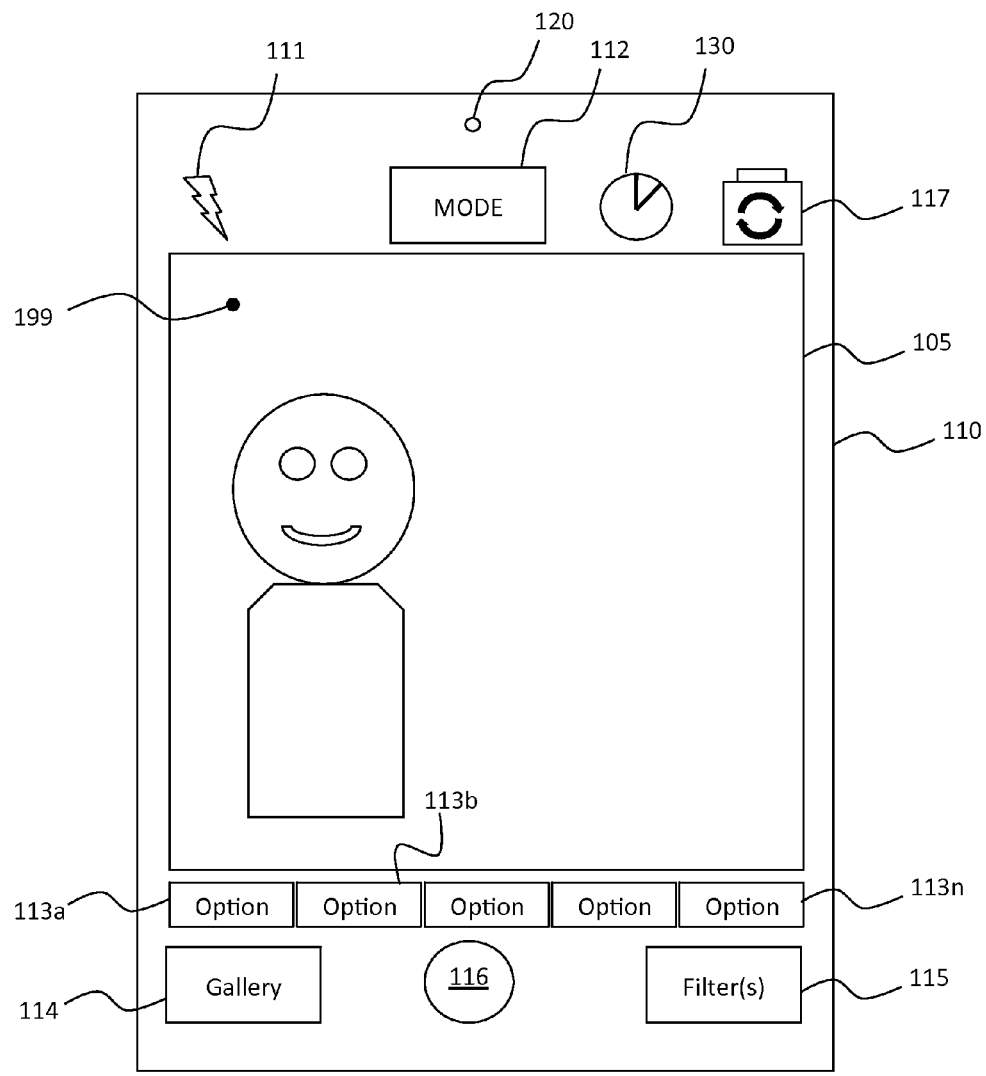
FIG. 1 illustrates a media capture GUI displayed on an electronic device running a media capture application according to some embodiments of the present technology.

FIG. 1 illustrates an exemplary media capture GUI 105 displayed on an electronic device 110 running a media capture application. The media capture GUI 105 can display video 199 of a scene to be captured by the electronic device 110.

The media capture GUI 105 also includes a plurality of interactive interface elements that provide both information and functionality to users of the media capture application. For example, the media capture GUI 105 of FIG. 1 includes a flash icon 111 allowing a user to adjust flash settings, a dynamic range mode icon 112 allowing a user to adjust a dynamic range (e.g. automatic High Dynamic Range mode) of media capture, media capture mode icons 113*a*, 113*b*, . . . 113*n* allowing a user to specify a type (e.g. Slow-Motion, Video, Photo, Square, Panoramic, etc.), a media collection gallery link 114 allowing a user to access a library of media items, a filter mode icon 115 allowing users to apply one or more digital filters when capturing media, and a virtual shutter icon 116 allowing a user to initiate media capture.

Figure 2:
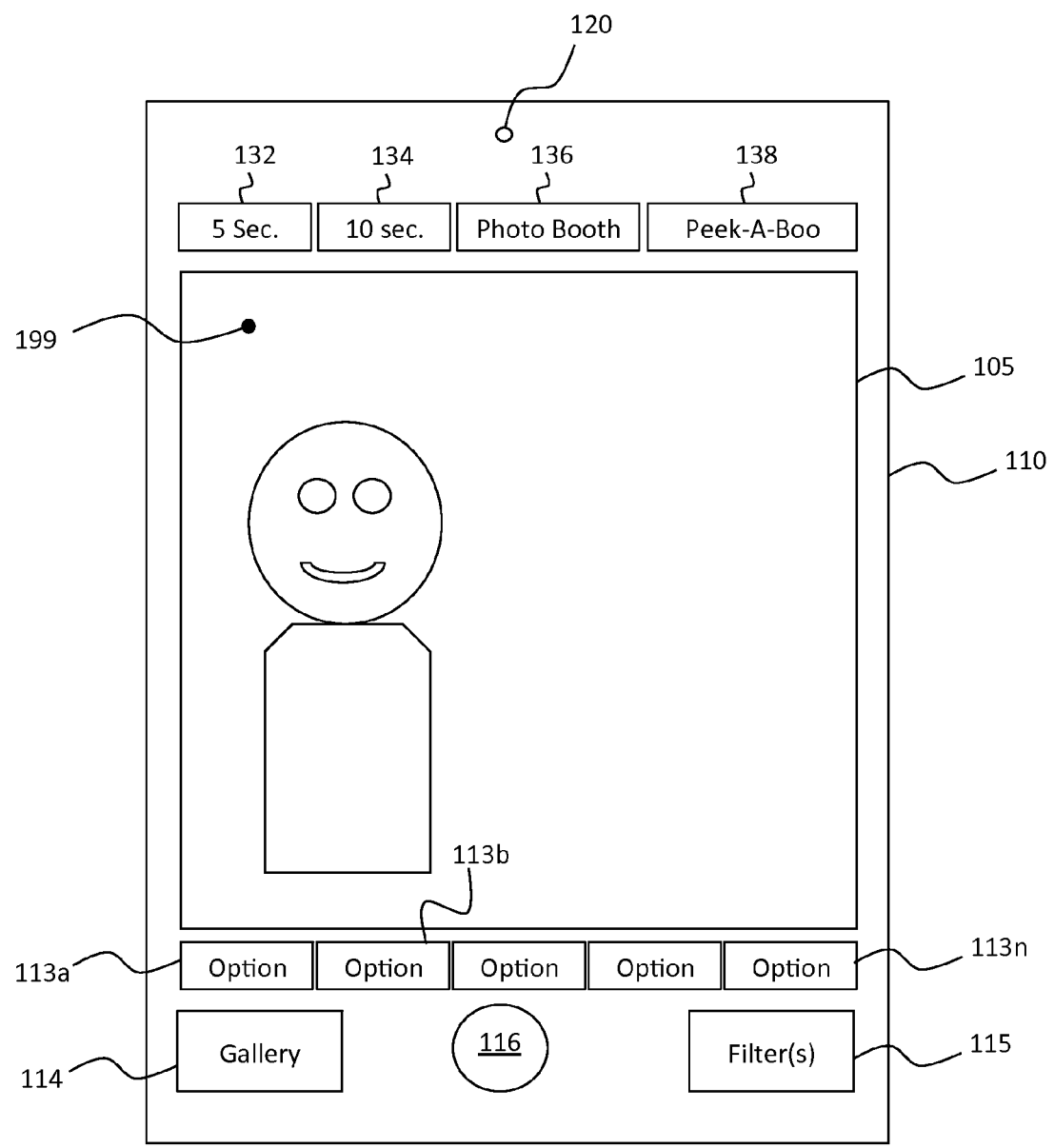
FIG. 2 illustrates a media capture GUI showing a plurality of icons displaying timer options according to some embodiments of the present technology.

Additionally, the media capture GUI 105 can include a countdown timer options icon 130. The countdown timer options icon 130 can be selected to access a plurality of timer options. For example, FIG. 2 illustrates a media capture GUI 105 showing a plurality of icons displaying timer options 132, 134, 136, 138 according to some embodiments of the present technology. Timer option icons 132, 134 can be selected to specify a five- and ten-second countdown timer, respectively. A countdown timer can begin countdown immediately upon selection of a timer option icon; alternatively, selection of a timer option icon can simply specify a countdown timer duration and the actual countdown can begin upon the occurrence of an event, e.g. detection of a face in the scene, detection of a gesture, etc. Timer option icon 136 can be selected to launch a photo booth (explained in greater detail below). Timer option icon 138 can be selected to select a peek-a-boo feature (explained in greater detail below).

Referring again to FIG. 1, in some embodiments, the electronic device 110 includes both a front-facing camera 120 and a rear-facing camera (not shown in FIG. 1). A front-facing camera 120 captures a mirror-like image of the scene displayed on the media capture GUI 105. The rear-facing camera captures a representation of a scene facing away from the media capture GUI. Consequently, the subject(s) of the scene to be captured cannot typically see the media capture GUI 105. In some embodiments, the media capture GUI 105 includes a front-/rear-facing camera toggle icon 117 allowing the user to specify whether they want to capture media using a front-facing camera 120 or rear-facing camera.

Figure 3:
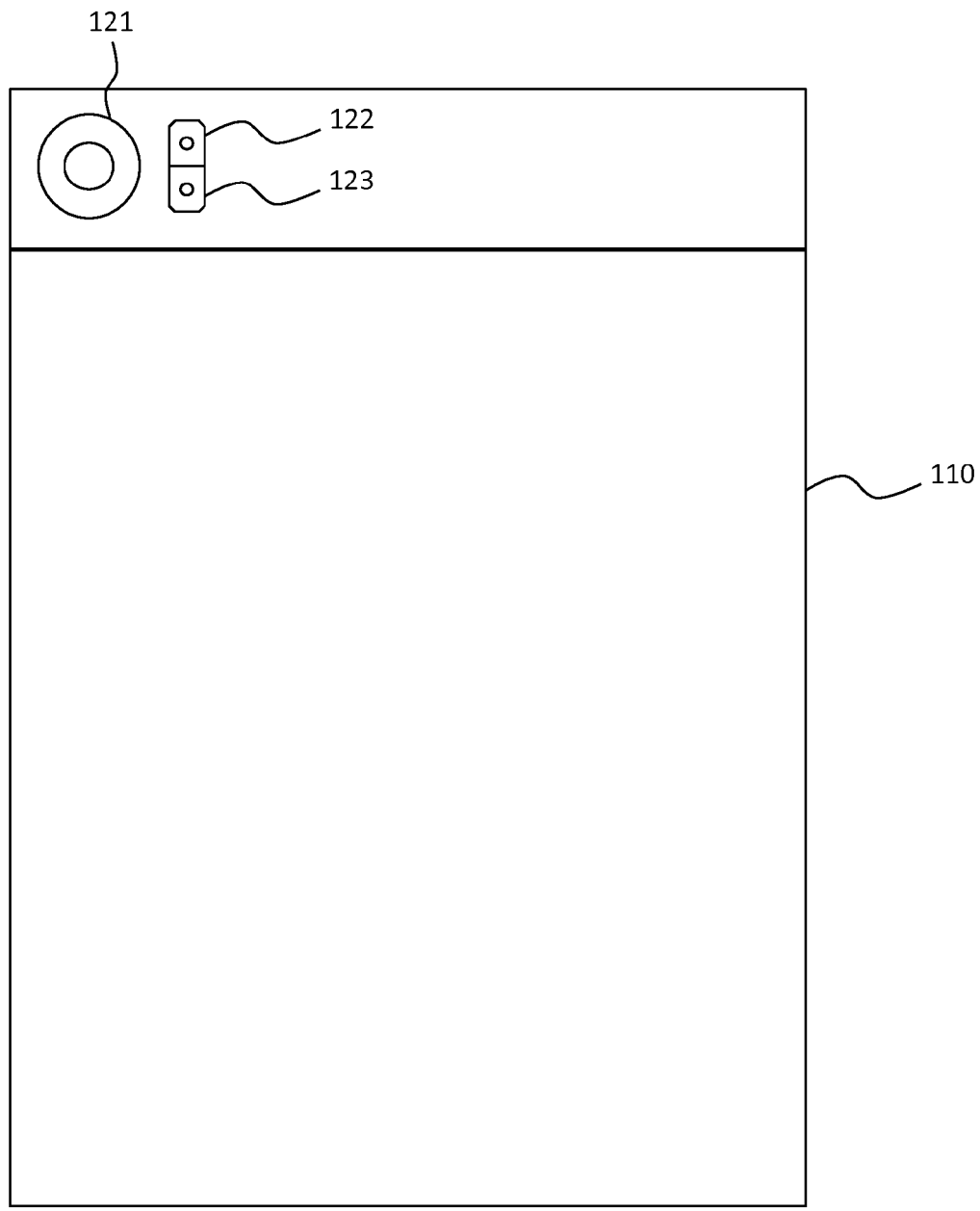
FIG. 3 illustrates an exemplary rear-facing camera on the back side of an electronic device.

Since the subject(s) of the scene to be captured cannot typically see the scene to be captured when using the rear-facing camera, the rear-facing camera can employ another way of giving the subjects information about a countdown. FIG. 3 illustrates an exemplary rear-facing camera 121 on the rear of the electronic device 110. The rear side of the electronic device 110 also includes one or more flash elements 122, 123 that can be used to signal a countdown. For example, the countdown can be indicated by simply flashing light a certain number of times at regular intervals (e.g. five one-second intervals) before capturing the scene. Alternatively, as the countdown nears expiration, the flash elements 122, 123 can begin to flash more rapidly. Also, the flash elements 122, 123 can be multi-toned, e.g. a white light flash element and an amber light flash element. In some embodiments, the intensity and/or the color of the flash can provide information about when countdown expires, e.g. seven soft amber flashes followed by three bright white flashes before scene capture.

Figure 4A:
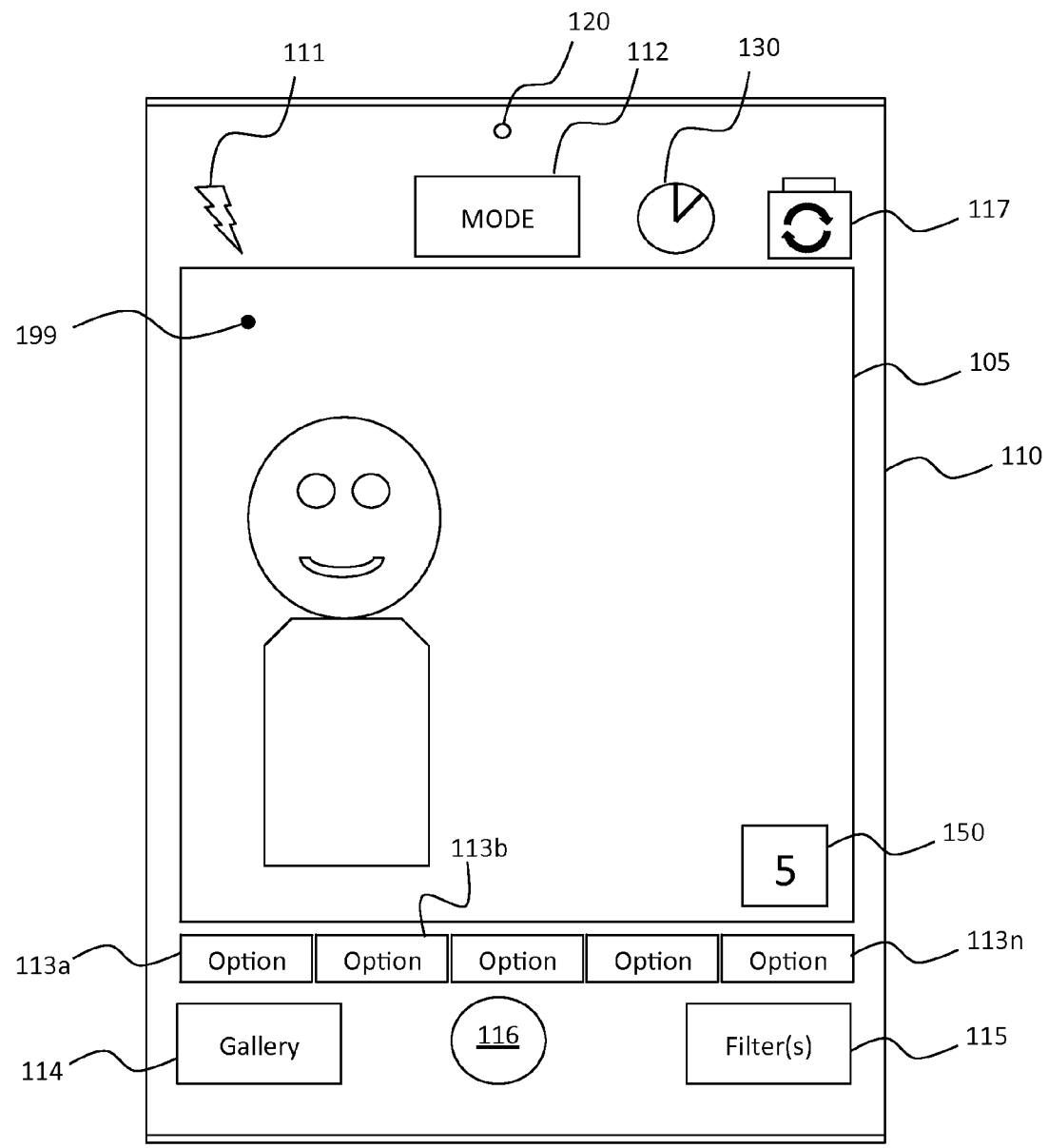
FIGS. 4A-C illustrates an exemplary series of scenes displayed on a GUI showing a digital counter element.
Figure 4B:
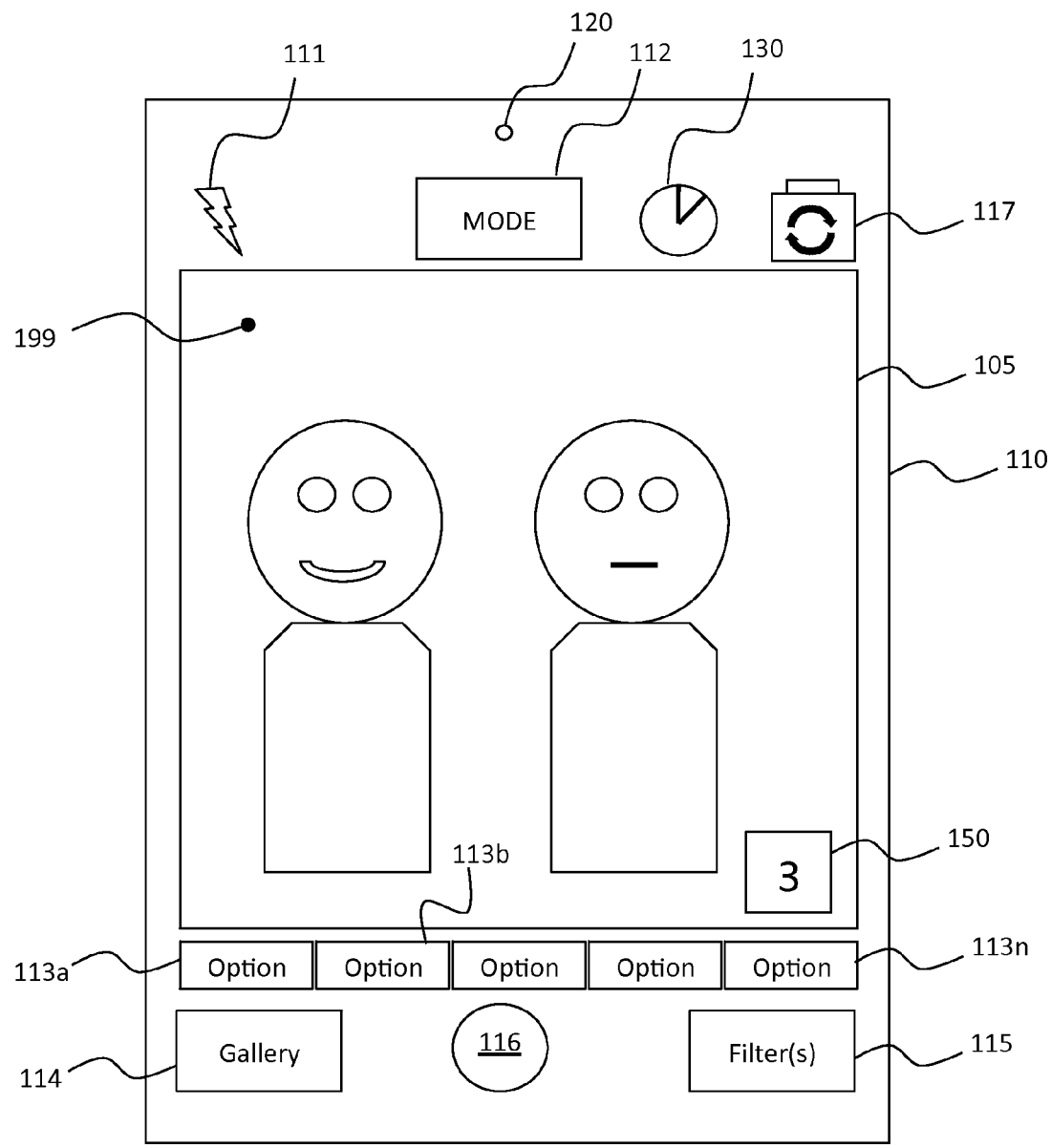
Figure 4C:
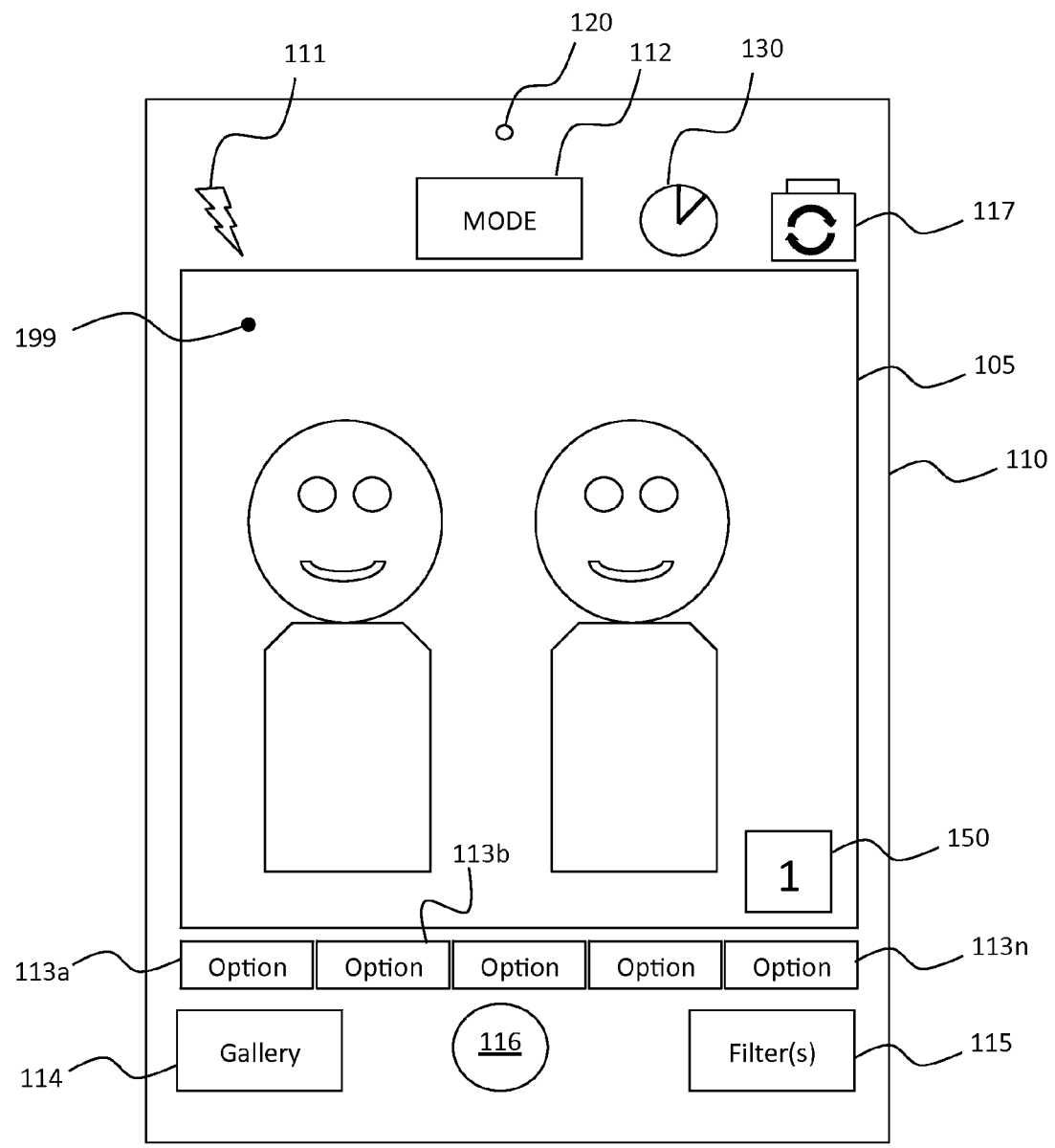

After selecting from the timer option icons when using front-facing camera 120, the GUI can display a digital counter element that can count down a period of time before a scene is captured. FIGS. 4A-C illustrate an exemplary series of scenes displayed on a GUI showing a digital counter element 150. In FIG. 4A a five-second digital counter element 150 is displayed (e.g. upon a user selecting timer option icon 132 and initiating a timer countdown) in a bottom corner of the GUI. In FIG. 4B the digital counter element 150 has decremented to three-seconds and another person (e.g. the person operating the electronic device 110) enters the scene and in FIG. 4C the new person poses as the digital counter element 150 decrements to one and eventually to zero—at which time the scene is captured.

Some embodiments of the present technology involve a dynamically sized digital counter element. For example, the digital counter element can increase in size, as a subject of a scene to be captured is far away from the front-facing camera of an electronic device. The electronic device or the media capture application can be configured to perform object detection or object recognition on the received frames of a scene. As the relative size of the detected object increase or decrease, the device or application can determine that object is closer or further away.

Figure 5A:
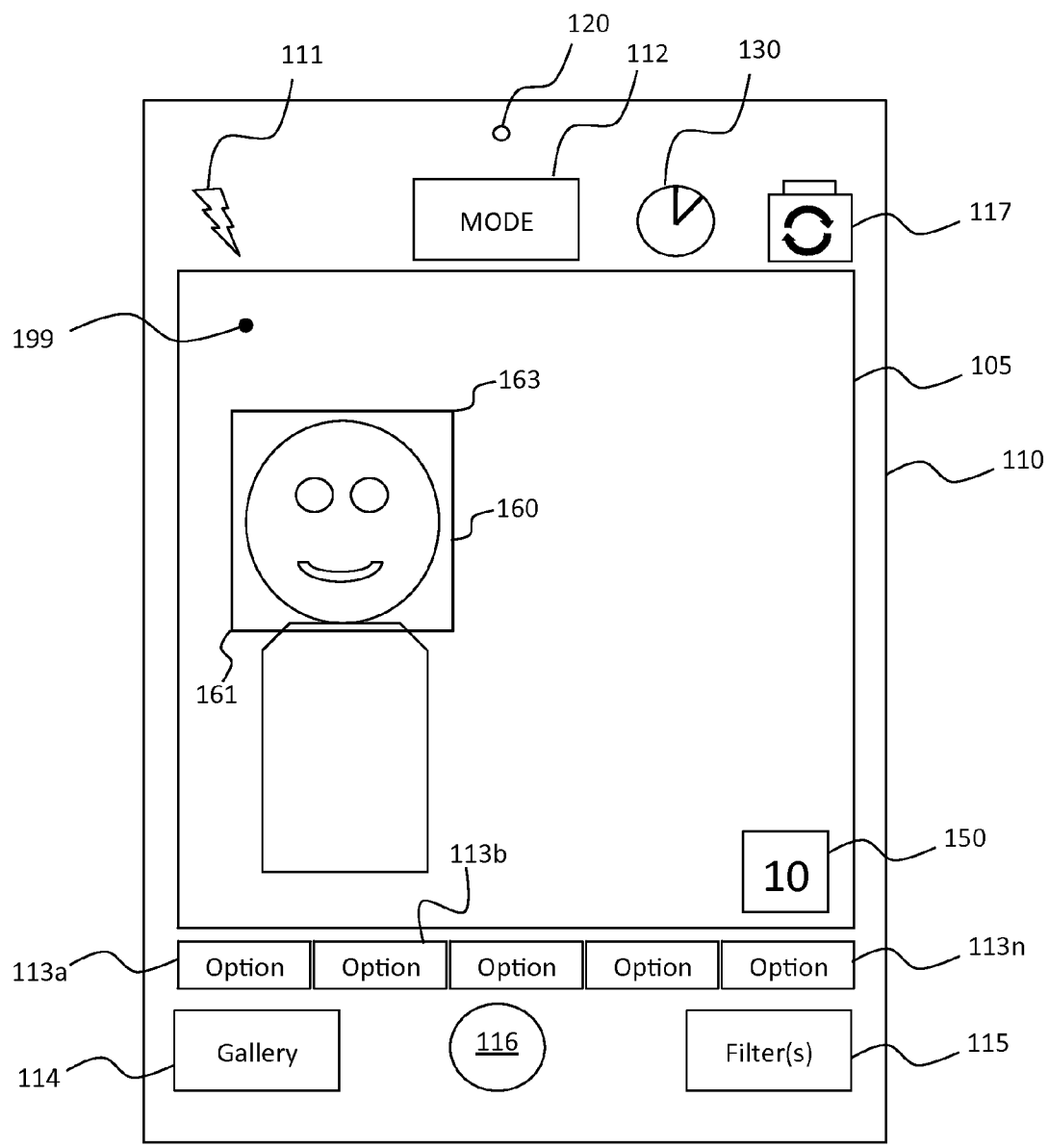
FIG. 5A-5C illustrates an exemplary series of scenes displayed on a GUI showing a scene to be captured by a camera and a bounding box indicating the detection of a face in the scene and its distance from the camera.

In some embodiments of the present technology, the distance that a human subject is located from the camera can be determined using facial detection technology, detecting a bounding box around a human face, and using the size of the bounding box to determine distance. FIG. 5A illustrates an electronic device 110 with a media capture GUI 105 that displays the video 199 of scene to be captured by a media capture application. The scene illustrated in FIG. 5A includes a bounding box 160 indicating the detection of a face in the scene. The electronic device 110 or the media capture application can measure the distance between two points (e.g. 161, 163) of the bounding box 160. As the bounding box changes size, the distance between the points changes and the electronic device 110 or the media capture application can determine that the distance between the face and the media capture GUI 105 has changed. In some cases the bounding box 160 is displayed and in some cases, the bounding box is not displayed.

In some embodiments, the media capture GUI 105 dynamically sizes the digital counter element 150 based on the size of the bounding box 160 detecting a face in the video 199 of a scene to be captured by a media capture application. For example, the size of the digital counter element 150 can grow larger when the distance between the points crosses a threshold size (e.g. thirty-five pixels), thereby increasing the visibility of the digital counter element 150 to the person whose face is bounded by the bounding box 160.

In FIG. 5A, the size and position of a digital counter element 150 are displayed in the media capture GUI 105 based on the distance between points 161, 163. When the distance between points 161, 163 is relatively large (meaning the person whose face is bounded by the bounding box 160 is near the media capture GUI 105), the electronic device 110 or the media capture application can make a policy decision to display the digital counter element at a relatively small size and in the corner of the media capture GUI 105 on an assumption that the person will be able to perceive it at their distance.

Figure 5B:
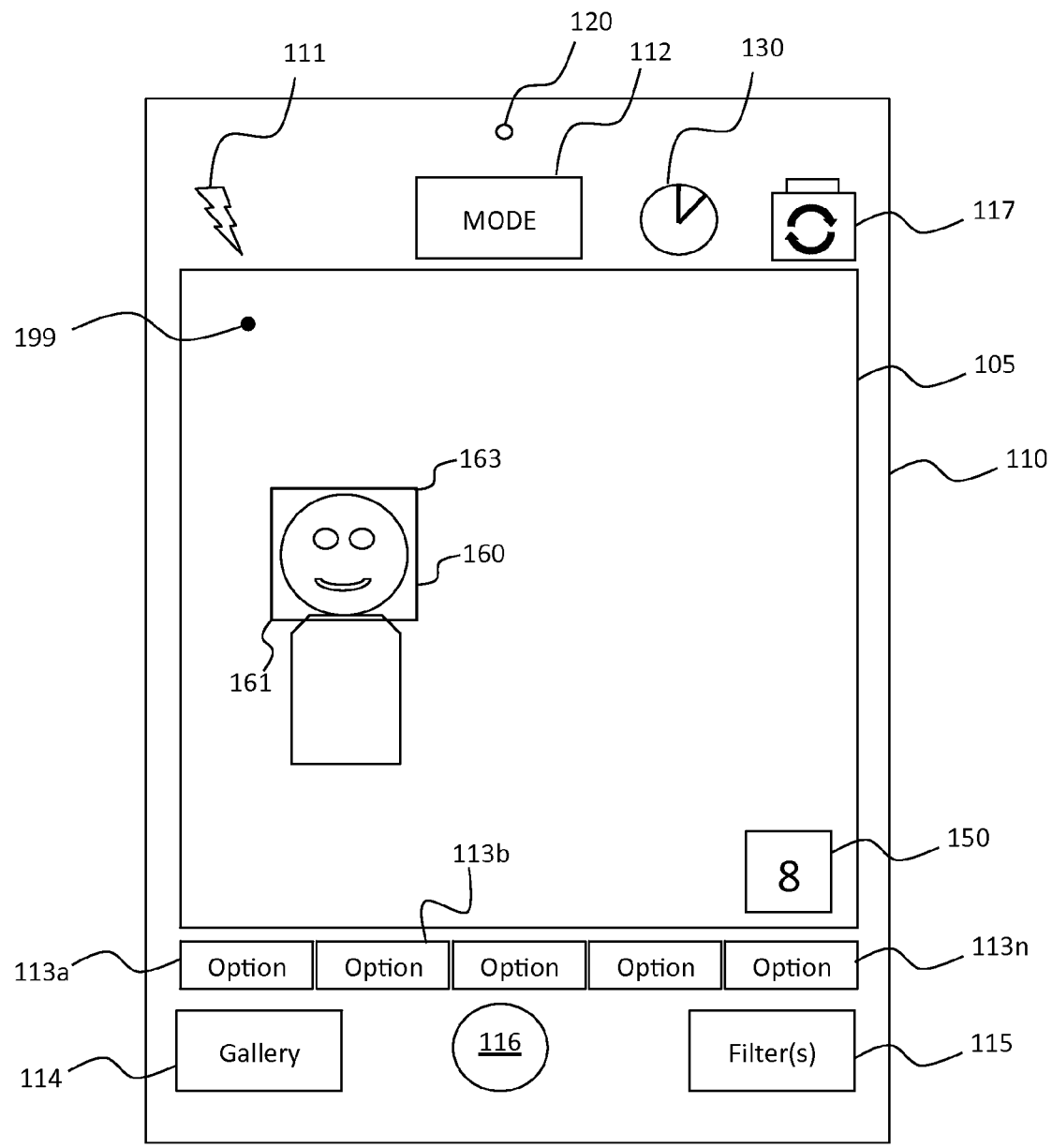
Figure 5C:
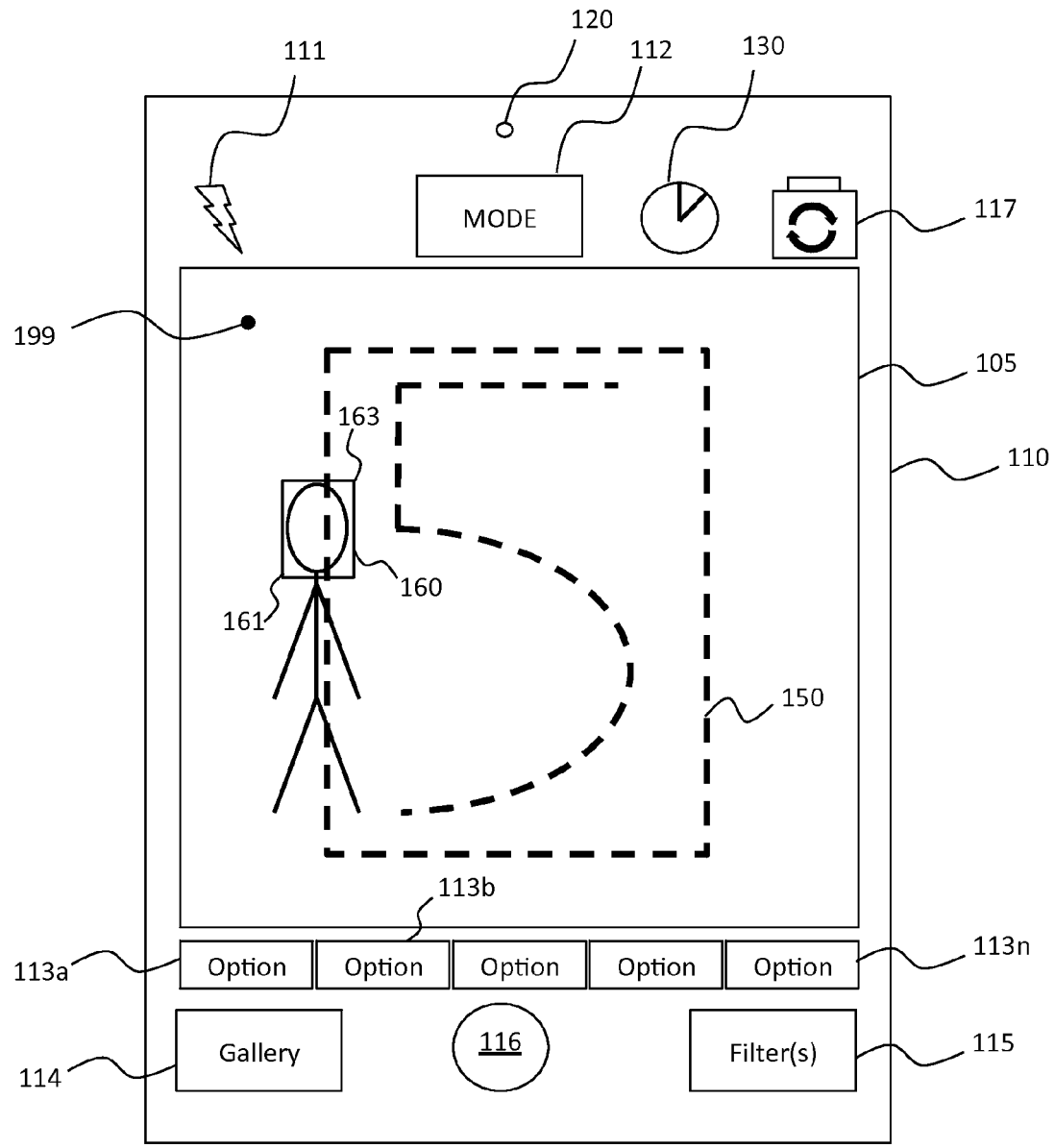

In FIG. 5B, the face bounded by the bounding box 160 has increased distance relative to the media capture GUI 105 and, likewise, the distance between points 161, 163 has decreased. However, the size and position of a digital counter element 150 displayed in the media capture GUI 105 remains the same because the distance between points 161, 163 has not crossed a predetermined threshold value. In FIG. 5C, the face bounded by the bounding box 160 has further increased distance relative to the media capture GUI 105 and, likewise, the distance between points 161, 163 has further decreased past the predetermined threshold value. Consequently, the digital counter element 150 has increased in size and position, thereby providing visibility to a further away viewer.

Additionally, and brightness of the digital counter element 150 is less (as indicated by the dashed lines) than the underlying scene displayed on the media capture GUI 105. In some embodiments of the present technology, brightness of a digital counter element 150 and of the underlying scene displayed on the media capture GUI 105 and the visual contrast between a digital counter element 150 and the underlying scene displayed on the media capture GUI 105 is dynamic, as explained in greater detail below. The digital counter element can also change color, flash, etc.

FIGS. 5A and 5B show a digital counter element 150 increasing in size, as the detected face appears smaller. Similarly, the digital counter element 150 can shrink in size, as the detected face appears closer.

The size of the digital counter element 150 can be increased in multiple steps based on multiple, predetermined thresholds. Similarly, the size of the digital counter element 150 can be gradually increased. For example, the size of the digital counter element 150 can be scaled by a factor related to the size of the bounding box 160.

Figure 6:
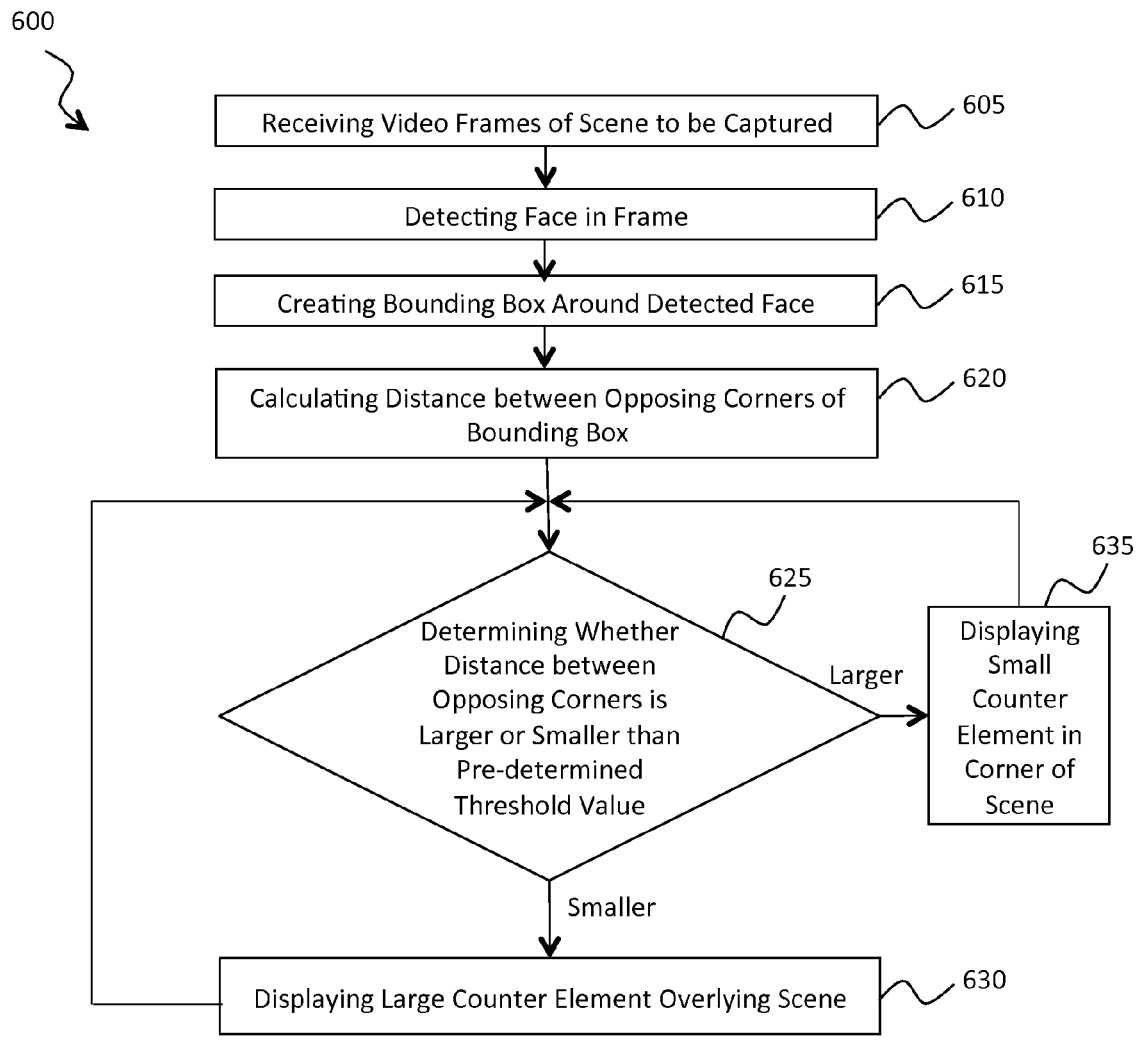
FIG. 6 illustrates a method of displaying a dynamically sized digital counter element according to some embodiments of the present technology.

FIG. 6 illustrates a method 600 of displaying a dynamically sized digital counter element according to some embodiments of the present technology. The method 600 involves an electronic device receiving video frames (e.g. via an image sensor) of a scene to be captured 605. Next, the method involves the electronic device, or media capture application being executed on the electronic device, detecting a face in a frame 610, creating a bounding box around a detected face 615, and calculating a distance between opposing corners of the bounding box 620.

As explained above, it is advantageous to display a small counter that does not obscure the video of a scene to be captured when the human subjects of the scene are close to the media capture GUI since they will be close enough to see the smaller counter and because they want to view a complete scene. Likewise, its is also advantageous to display a large counter that takes up more of the scene when the human subjects of the scene are far away so that the human subjects can discriminate the counter from the further distance. Therefore, the method 600 further involves determining when human subjects are near or far and displaying a counter element to satisfy both of the above concerns. More specifically, the method 600 involves determining 625 whether the distance between opposing corners of a bounding box is larger or smaller than a pre-determined threshold value (e.g. number of pixels, ratio of screen size, etc.)

When the distance between opposing corners is smaller than the predetermined threshold value, then the method 600 involves displaying a large counter element that overlays the scene 630 and iteratively determining 625 whether the distance between opposing corners of a bounding box is larger or smaller than a pre-determined threshold value.

Conversely, when the distance between opposing corners is larger than the predetermined threshold value, then the method 600 involves displaying a small counter in the corner of the scene 635 and iteratively determining 625 whether the distance between opposing corners of a bounding box is larger or smaller than a pre-determined threshold value.

As mentioned above, some embodiments of the present technology involve dynamic adjustments brightness of a digital counter and the video of the underlying scene displayed on the media capture GUI and to the contrast between a digital counter and the video of the underlying scene displayed on the media capture GUI.

Dynamic contrast can take a variety of forms including: the counter fading in from transparent to opaque as the counter counts down; the video fading to black and the counter fading in from transparent to white and opaque as the counter counts down; the counter fading in from semi-transparent to opaque and the video fading out to semi-transparency as the counter counts down; the brightness of the counter and the video being adjusted, increasing sharpness of the counter as the counter counts down, etc. Although the above examples of dynamic visual contrast are mentioned explicitly, those with ordinary skill in the art having the benefit of the disclosure will readily appreciate that a wide variety of visual adjustments can be made to the counter and the video to increase visual contrast. The digital counter element can also change color, can flash/pulse, etc.

Some embodiments of the present technology involve a processor in a media capture device that examines video frame data of a scene to be captured, and determines how to best increase contrast between the video and a counter element.

Figure 7:
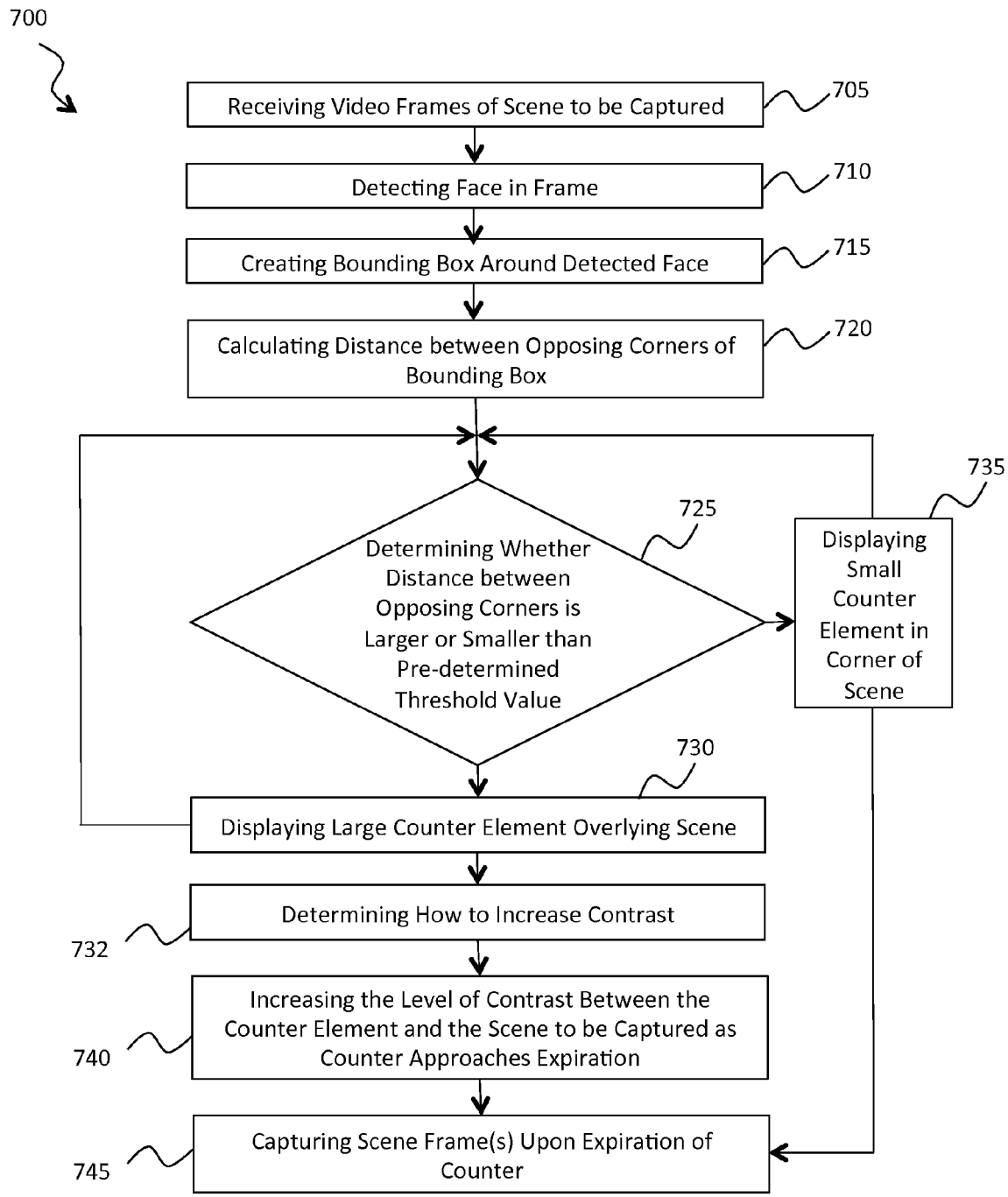
FIG. 7 illustrates an exemplary method of dynamically adjusting the contrast between a counter element and the video of a scene to be captured.

FIG. 7 illustrates an exemplary method 700 of dynamically adjusting the contrast between a counter element and the video of a scene to be captured. The method 700 involves receiving video frames of a scene to be captured 705, detecting a face in a frame 710, creating a bounding box around a detected face 715, calculating a distance between opposing corners of the bounding box 720, and determining 725 whether the distance between opposing corners of a bounding box is larger or smaller than a pre-determined threshold value. When the distance between opposing corners is larger than the predetermined threshold value, then the method 700 involves displaying a small counter in the corner of the scene 735, iteratively determining 725 whether the distance between opposing corners of a bounding box is larger or smaller than a pre-determined threshold value, and capturing scene frame(s) upon the expiration of the counter 745.

When the distance between opposing corners is smaller than the predetermined threshold value, then the method 700 involves displaying a large counter element that overlays the scene 730 and iteratively determining 725 whether the distance between opposing corners of a bounding box is larger or smaller than a pre-determined threshold value. Additionally, the method 700 involves determining how to increase contrast between the counter element and the scene 732. In some embodiments of the present technology, determining how to increase contrast can involve gathering scene information from an image sensor or media processing system and determining one or more image qualities (e.g. brightness, transparency, sharpness, color, etc.) to adjust in the scene and/or the counter that will increase visual contrast between the two. The method 700 also involves increasing the level of contrast between the counter element and the scene to be captured as the counter approaches expiration 740, and capturing scene frame(s) upon the expiration of the counter 745.

FIGS. 8A-8D illustrate dynamic contrast between a digital counter element 150 and objects in a video 199 of scene to be captured as the timer represented by the digital counter element 150 approaches expiration according to some embodiments of the present technology. In the discussion of FIGS. 8A-8D, brightness and transparency are used to describe contrast; however, as explained above, those with ordinary skill in the art having the benefit of the disclosure will readily appreciate that a wide variety of visual adjustments can be made to graphical elements to increase visual contrast.

Figure 8A:
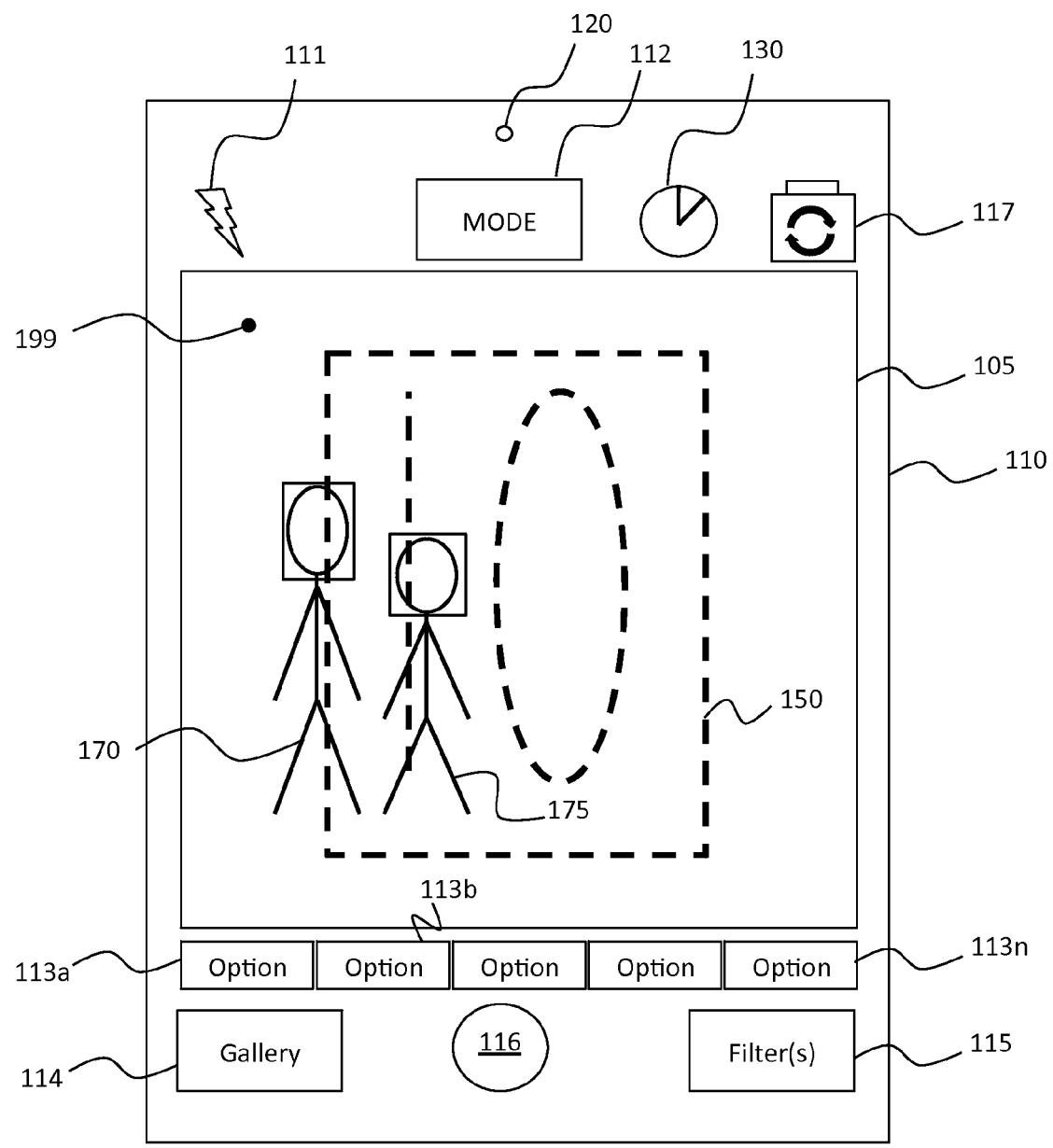
FIGS. 8A-8D illustrate dynamic contrast between a digital counter element and objects in a video of scene to be captured as the timer represented by the digital counter element approaches expiration according to some embodiments of the present technology.

FIG. 8A illustrates an electronic device 110 with a media capture GUI 105 that displays video 199 of a scene to be captured by a media capture application. The scene illustrated in FIG. 8A includes subjects 170, 175 of the scene to be captured having a high brightness and opacity (as indicated by the solid lines) and the digital counter element 150 having low brightness and semi-transparency (as indicated by the dashed lines.)

Figure 8B:
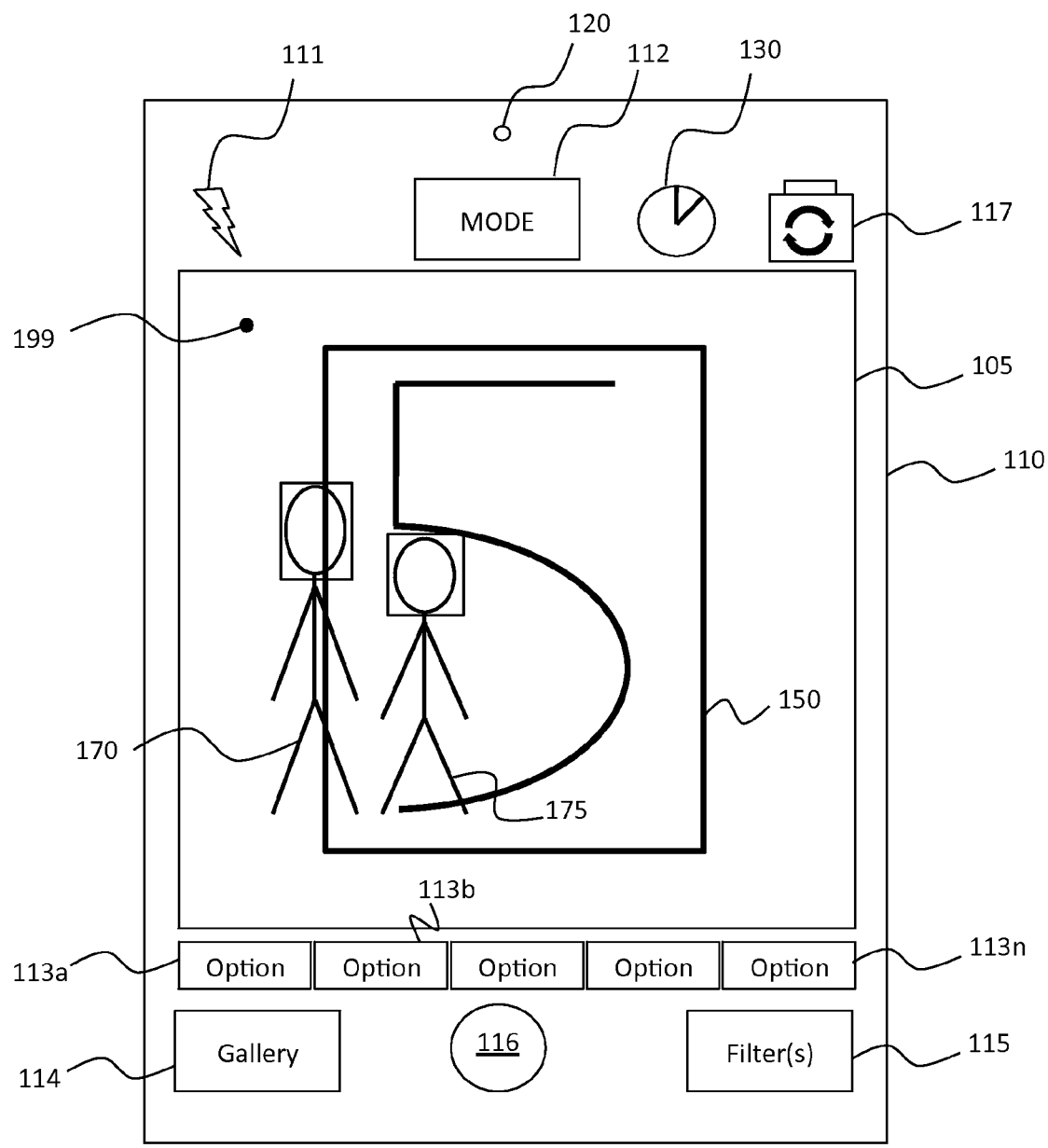

FIG. 8B illustrates an electronic device 110 with the media capture GUI 105 as the timer represented by the digital counter element 150 approaches expiration. As shown in FIG. 8B, the subjects 170, 175 of the scene to be captured by a media capture application and the digital counter element 150 have equal levels of brightness and opacity.

Figure 8C:
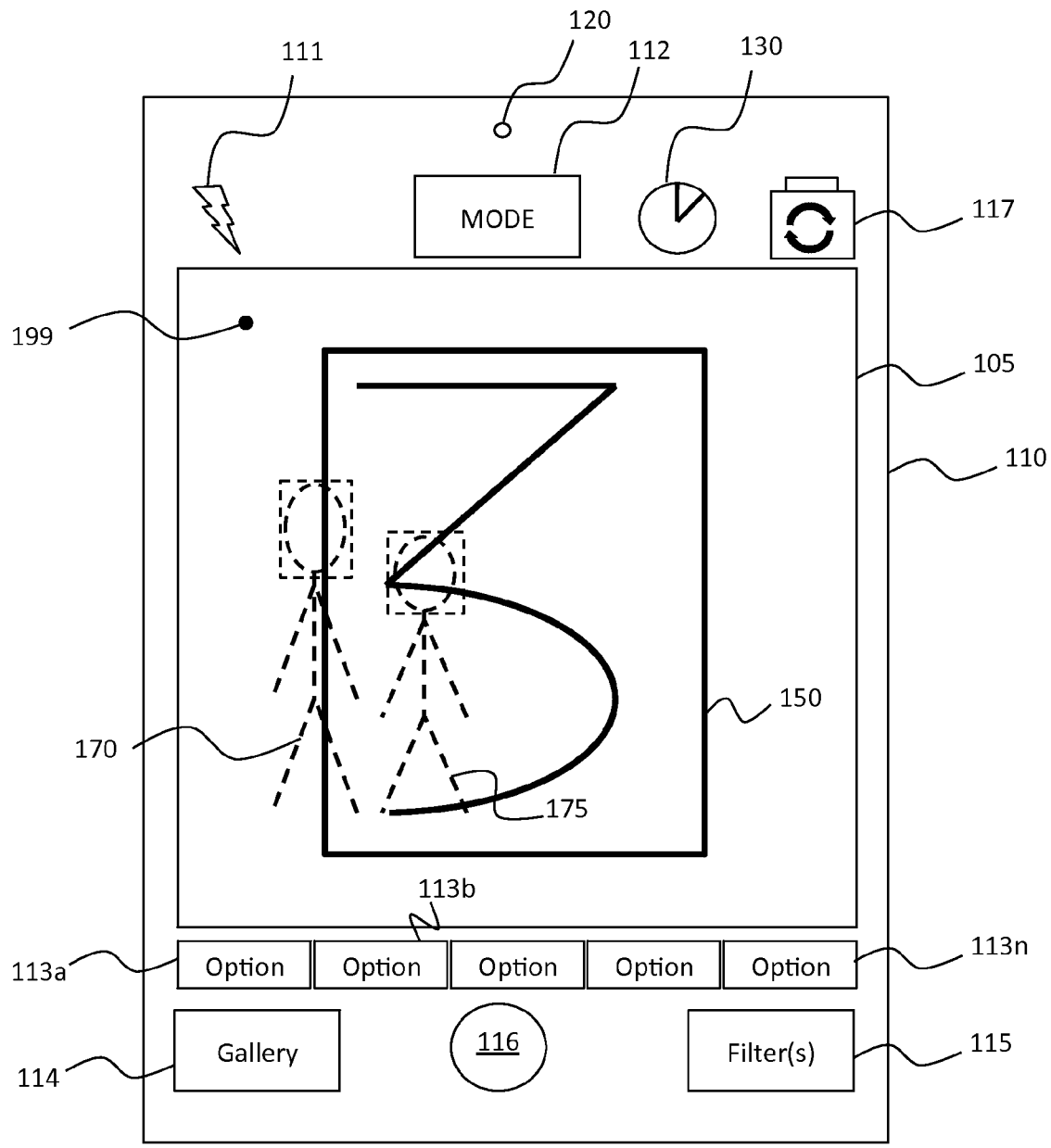

FIG. 8C illustrates an electronic device 110 with the media capture GUI 105 as the timer represented by the digital counter element 150 further approaches expiration. As shown in FIG. 8C, the subjects 170, 175 of the scene to be captured by a media capture application have low brightness and are semi-transparent (as indicated by the dashed lines) while the digital counter element 150 has a high brightness and is opaque (as indicated by the solid lines).

Figure 8D:
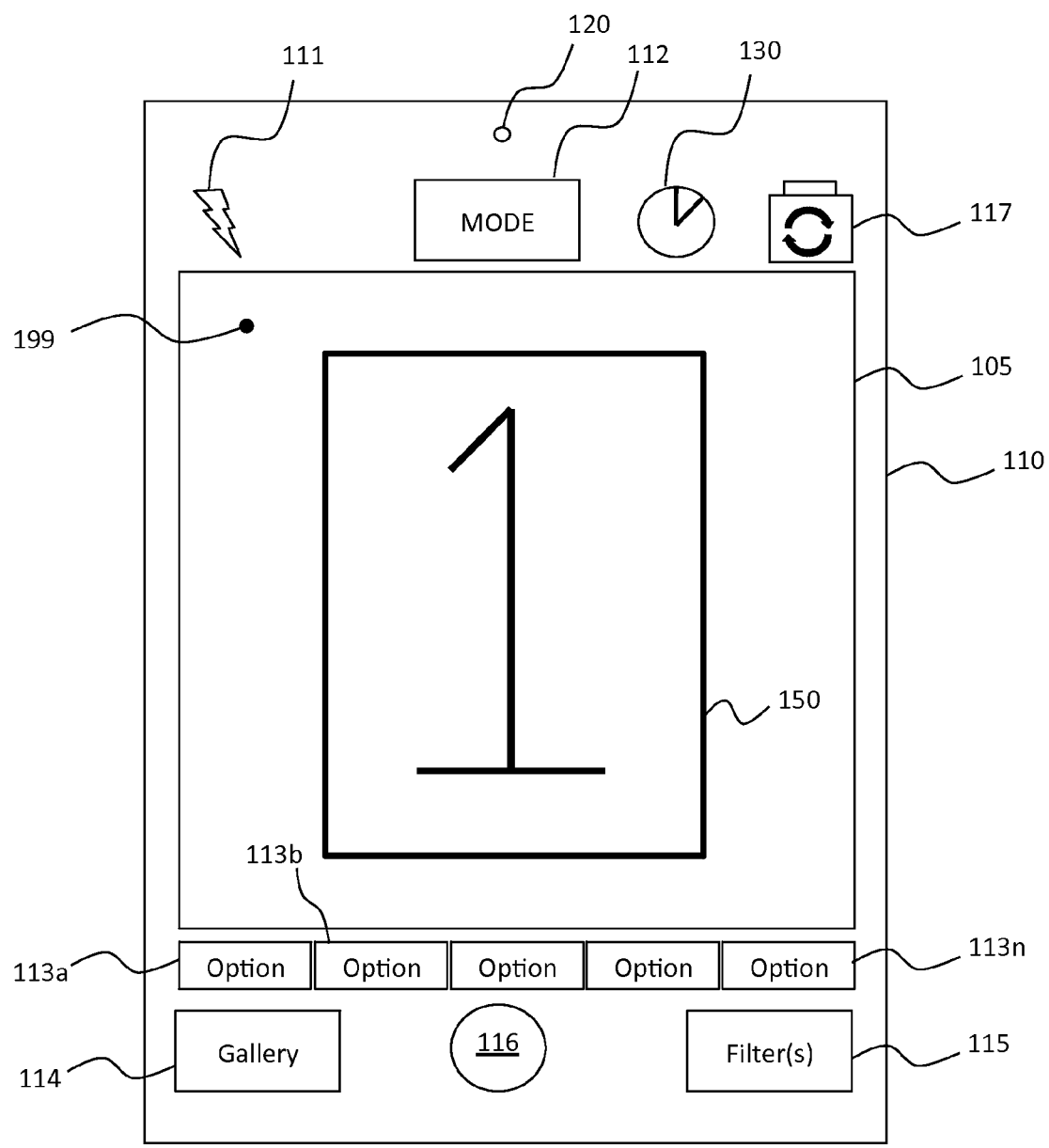

FIG. 8D illustrates an electronic device 110 with the media capture GUI 105 as the timer represented by the digital counter element 150 further approaches expiration. As shown in FIG. 8D, the subjects 170, 175 of the scene to be captured by a media capture application have no brightness and/or are completely transparent while the digital counter element 150 has a very high brightness and is opaque (as indicated by the double solid lines). Although FIGS. 8A-8D illustrate that the scene to be captured by a media capture application is shown to fade to white while the digital counter element 150 fades to black, the opposite effect can also be performed, as will be apparent to those with ordinary skill in the art having the benefit of the disclosure.

As described above, a timer option icon can be used to initiate a countdown timer and cause a digital counter element to be displayed on a media capture GUI. However, a wide variety of approaches can be used to initiate a timer, pause a timer, resume a paused timer, restart a timer, set a series of timers, etc. For example, some embodiments of the present technology involve starting a camera timer using object detection, gesture detection, multiple object detection, etc.

Figure 9A:
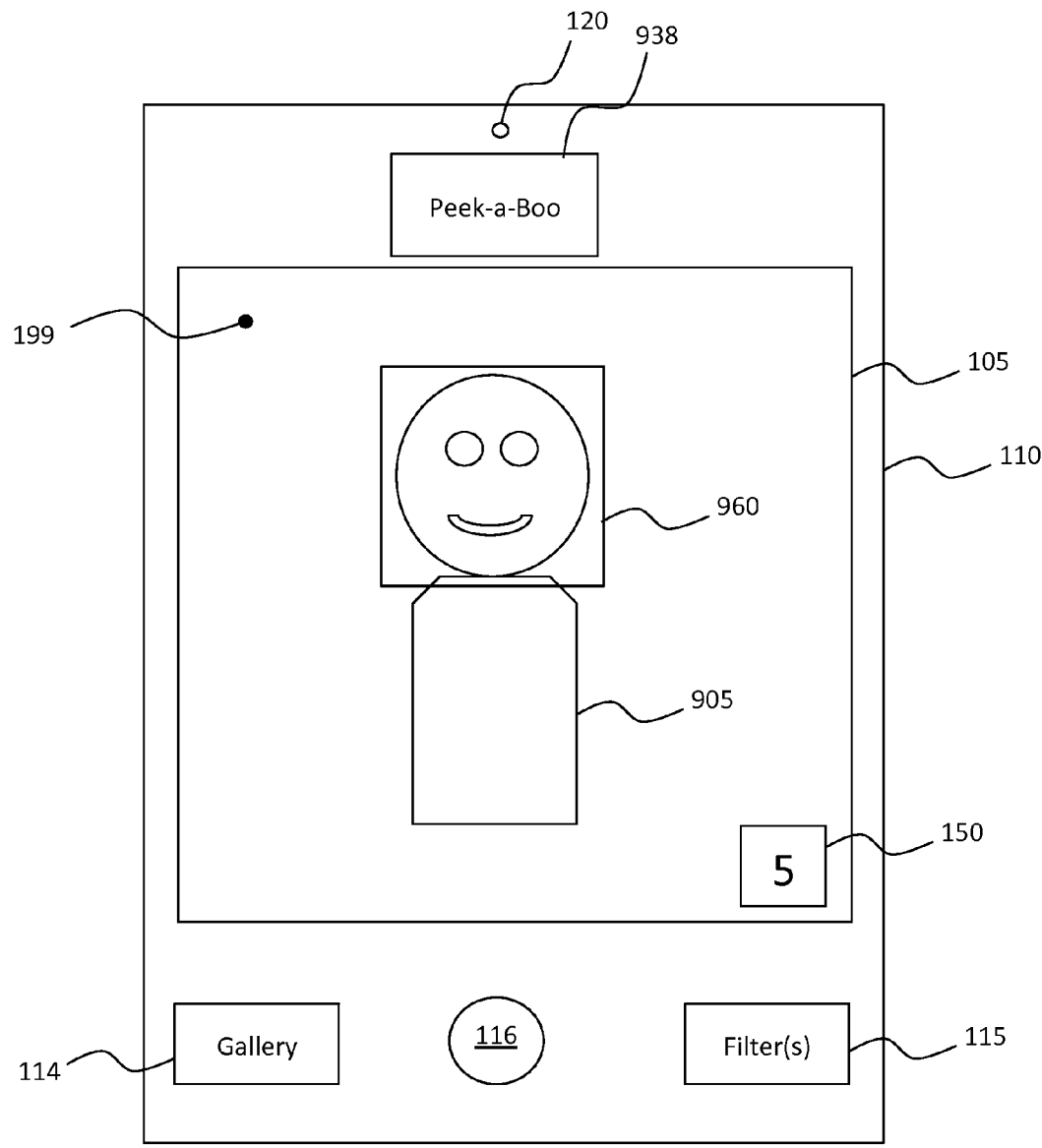
FIGS. 9A-9C illustrate an exemplary peek-a-boo system of timer initiation.
Figure 9B:
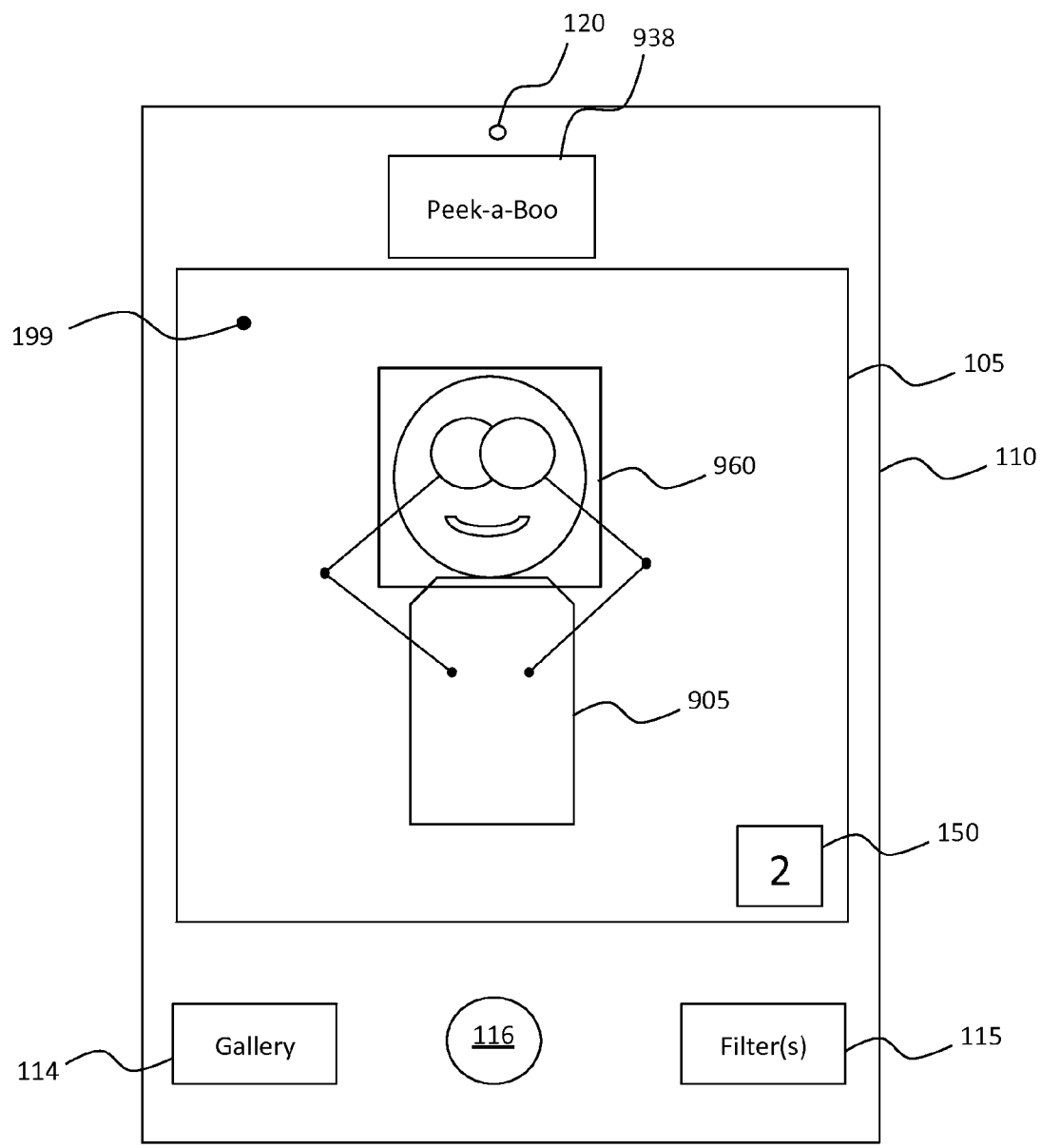
Figure 9C:
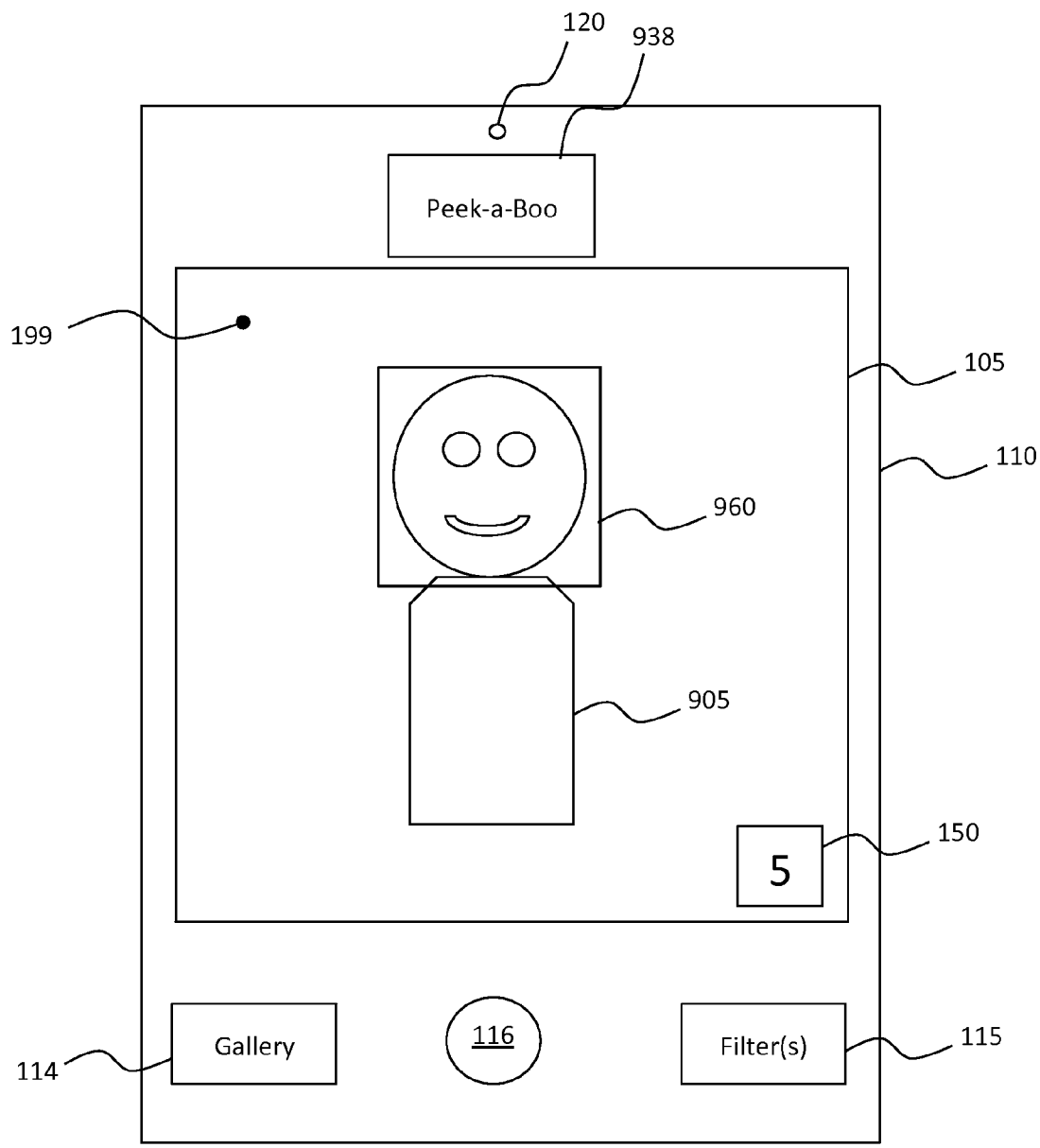

Referring again to FIG. 2, the media capture GUI 105 includes a timer option icon 136 that can be selected to launch a photo booth and a timer option icon 138 that can be selected to select a peek-a-boo feature. FIGS. 9A-9C illustrate a peek-a-boo system of timer initiation and FIGS. 10A-10D illustrate a photo-booth function according to some embodiments of the present technology.

FIGS. 9A-9C illustrate an exemplary peek-a-boo system of timer initiation. In FIG. 9A, the media capture GUI 105 includes video 199 of a scene to be captured by the front-facing camera 120 and a FIG. 905 in the scene to be captured. The electronic device 110 or the media capture application can detect the figure's 905 face and display a bounding box 960 around the detected face. The media capture GUI 105 also includes a digital counter element 150 representing a timer initiated upon the selection of the timer option icon 138 and an timer option exit icon 938 to return to the media capture GUI 105, as illustrated in FIG. 2, for example.

In FIG. 9B, the digital counter element 150 indicates that the expiration of the countdown of timer is approaching. However, the FIG. 905 in the scene to be captured covered its face (e.g. a peek-a-boo gesture) and the electronic device 110 or the media capture application can detect the gesture and interpret the gesture as the FIG. 905 wanting to pause or restart the timer. FIG. 9C shows the media capture GUI 105 with the FIG. 905 after performing the gesture and the digital counter element 150 being re-started.

Alternatively, in some embodiments of the present technology, the timer and corresponding digital counter element 105 does not start counting down towards expiration upon selection of timer option icon 138. Rather, the timer starts when the FIG. 905 performs a specific (e.g. peek-a-boo) gesture.

Figure 10A:
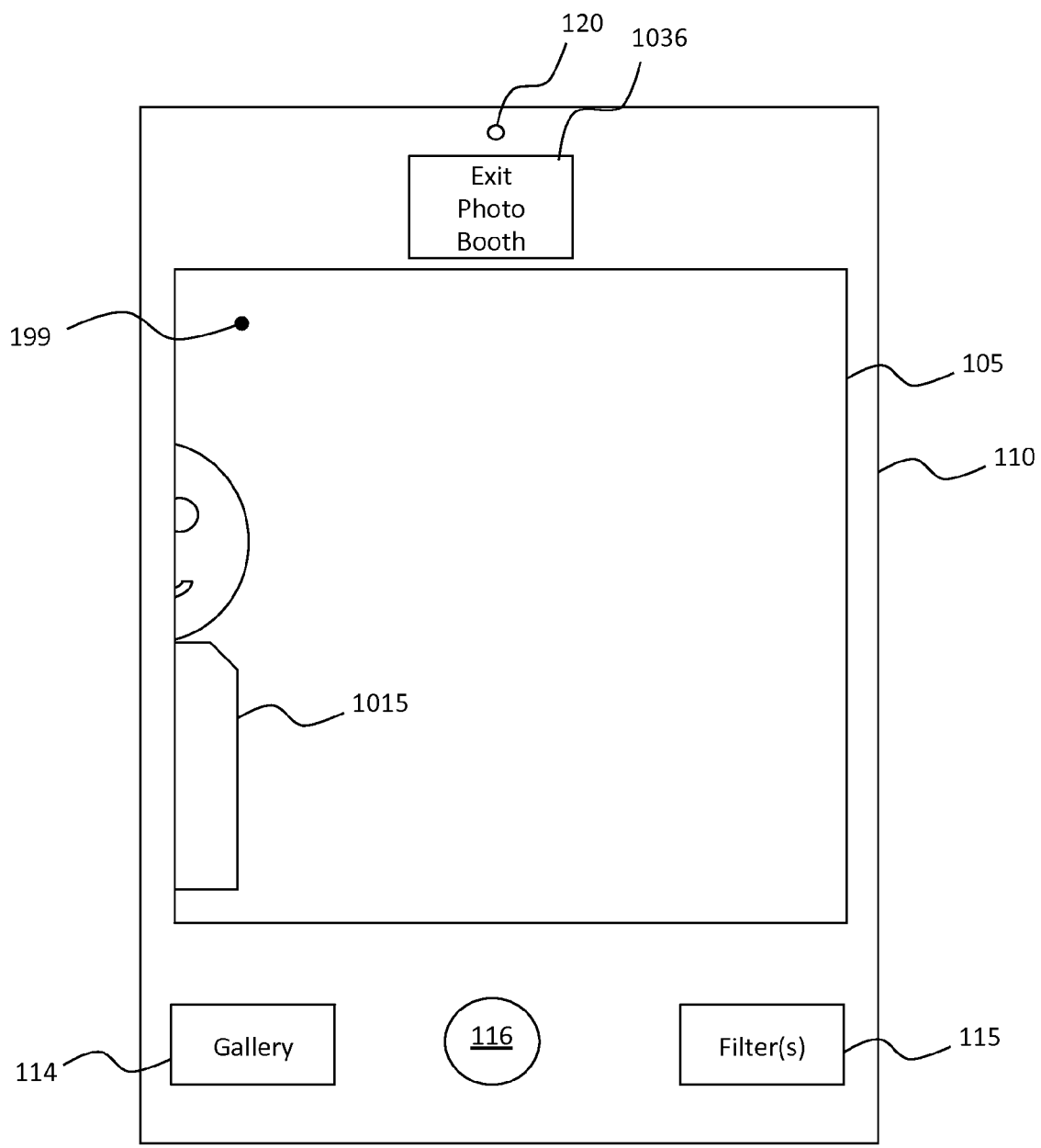
FIGS. 10A-10D illustrate an exemplary photo-booth function.

As explained above, FIGS. 10A-10D illustrate an exemplary photo-booth function. In FIG. 10A, the media capture GUI 105 includes video 199 of a scene to be captured by the front-facing camera 120 and a FIG. 1015 entering in the scene to be captured. The electronic device 110 or the media capture application can detect faces; however, the figure's 1015 face is not yet completely in the scene. The media capture GUI 105 shown in FIGS. 10A-10D also includes a timer option exit icon 1036 to return to the media capture GUI 105, as illustrated in FIG. 2, for example.

Figure 10B:
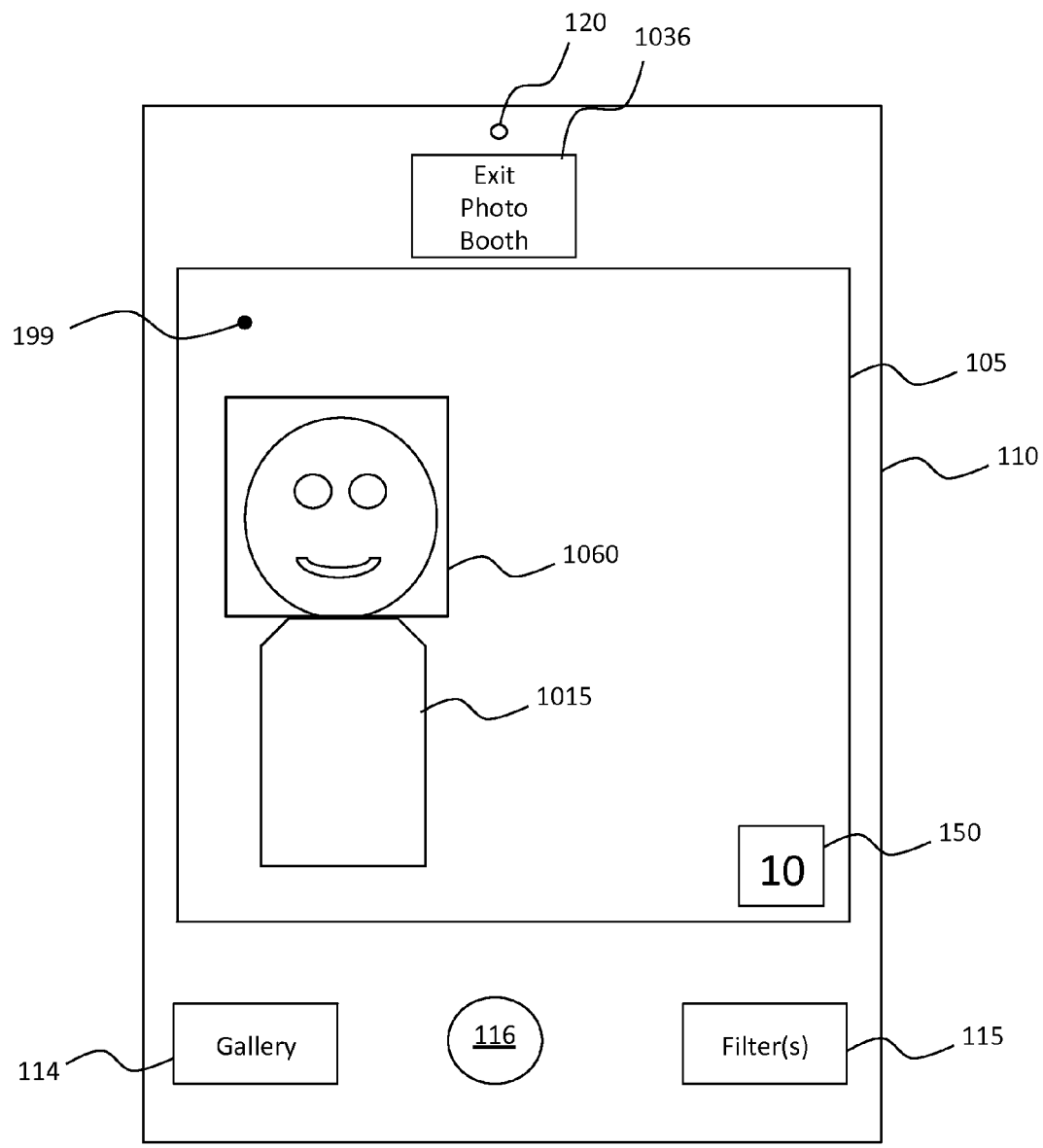

In FIG. 10B, the figure's 1015 face is completely in the scene and the electronic device 110 or the media capture application detects the figure's 1015 face. In some embodiments of the present technology, detection of a face during a performance of a photo booth function causes a digital counter element 150 representing a timer to be displayed in the media capture GUI 105. Upon detection of a face, the media capture GUI 105 can display a bounding box 1060 around the detected face.

Figure 10C:
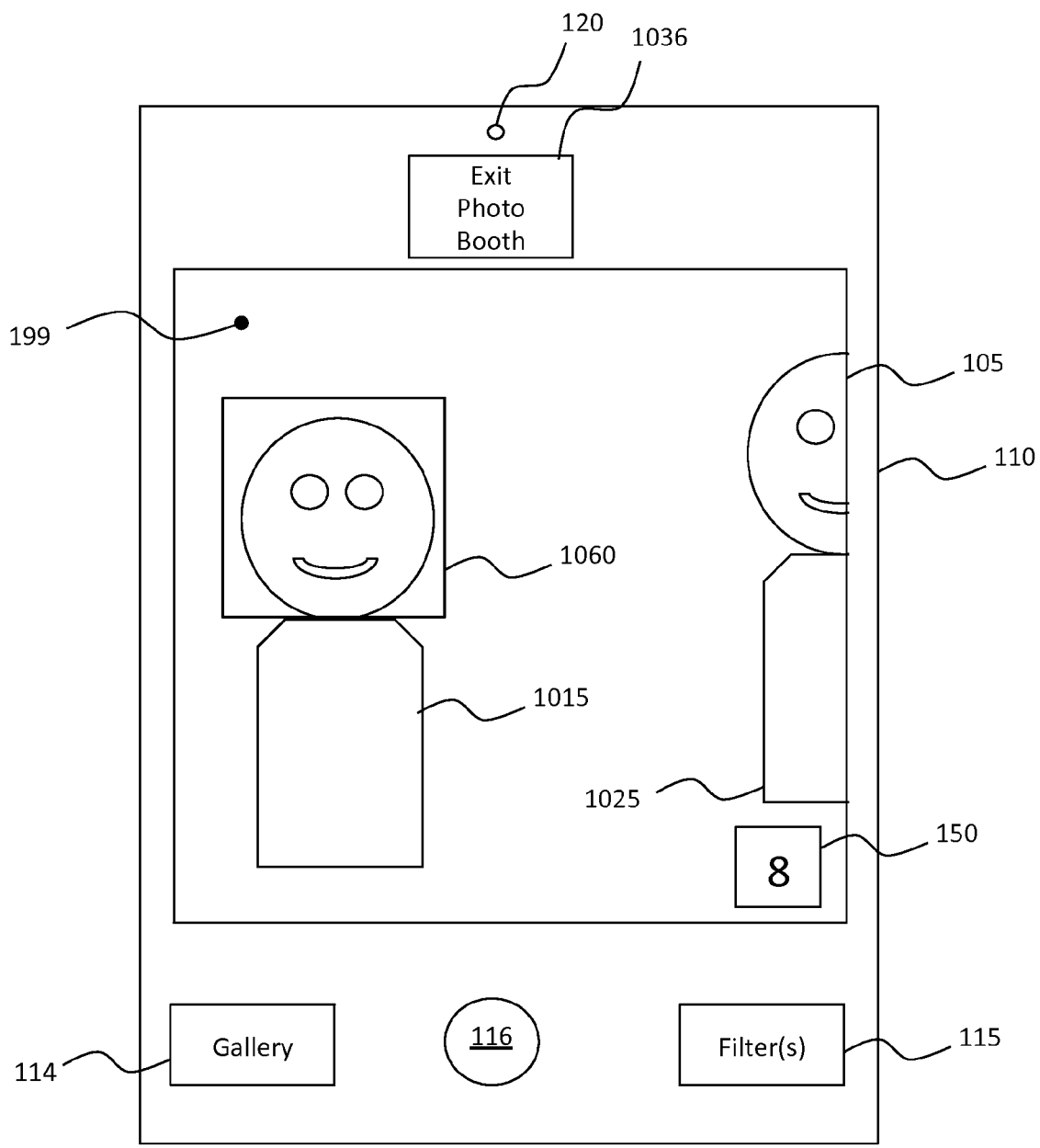
Figure 10D:
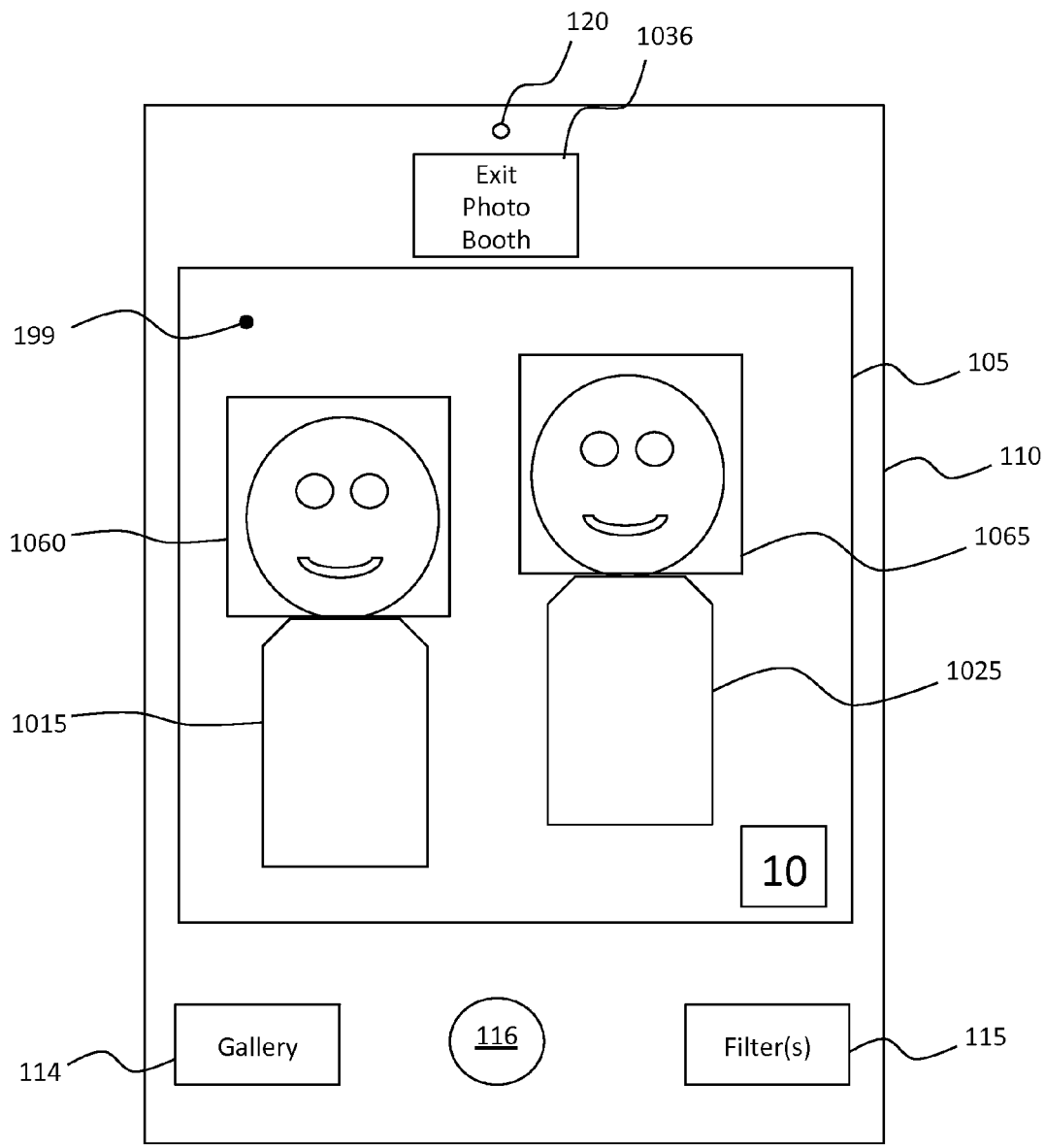

In FIG. 10C, another FIG. 1025 enters in the scene to be captured; however, the figure's 1025 face is not yet completely in the scene and the digital counter element 150 indicates that the countdown of timer is continuing. In FIG. 10D, figure's 1025 face is completely in the scene, the electronic device 110 or the media capture application detects the figure's 1015 face, displays a bounding box 1065, and restarts the time represented by the digital counter element 150.

Figure 10E:
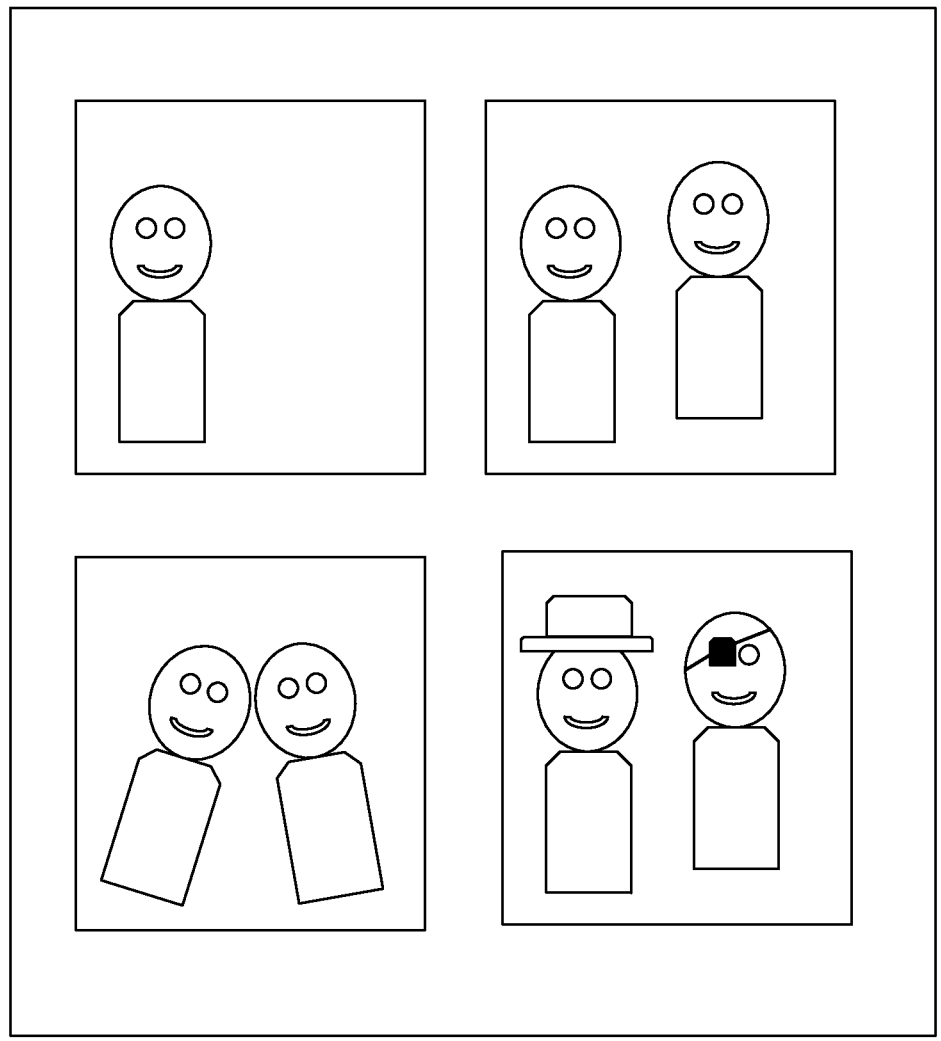
FIG. 10E illustrates an N-up frame capture display using a photo booth function according to some embodiments of the present technology.

Upon expiration of the timer represented by the digital counter element 150, the electronic device 110 can capture one or more frames (e.g. a burst, as explained below) of the scene. In some embodiments, the electronic device 110 or media capture application can automatically restart the timer and refresh the digital counter element 150 while performing a photo booth function. For example, while in a photo booth mode, the electronic device 110 or media capture application can refresh the timer a predefined number of times upon detecting a figure or figures' face. Also, while in a photo booth mode, the electronic device 110 or media capture application can refresh the timer so long as additional figures' faces are detected. Additionally, the electronic device 110 or media capture application can store and display a series of frames captured while in photo booth mode in an N-up format. An exemplary N-up frame capture display using a photo booth function is illustrated in FIG. 10E.

As discussed above, upon the expiration of the counter, the electronic device captures one or more scene frames. Capturing scene frames can involve, capturing a single, a series of frame at a certain frame rate for video playback, a series of frames at a very high frame rate for slow-motion playback, etc.

Many scenarios when using a timer is required involve a person posing or multiple people posing at the same time and it is difficult to synchronize everyone's best pose. Consequently, some embodiments of the disclosed technology involve capturing a burst of frames upon the expiration of a timer to increase the likelihood that at least one frame in the burst is acceptable (e.g. everyone smiling, no blinking, etc.)

Some embodiments of the present technology involve continuous image-capturing. After entry into an image-capturing mode, a sequence of images can be captured with an image-capturing device and predetermined number of the sequence of images can be stored in a buffer. After receiving a user request to capture an image, the device can automatically select one of the buffered images based on one or more parameters. For example, the selection may be based on an exposure time and optionally an image quality parameter (e.g., image contrast). In some embodiments, the sequence of images is captured just prior to or concurrently with receiving the user request. An image captured prior to a user requesting the capture of an image can have an image quality that is not degraded by camera shake associated with the user request.

Some embodiments of the present technology involve a device that includes all of the needed circuitry and/or software for implementing the digital camera functions of the electronic viewfinder, shutter release, continuous image-capturing, storing of a predetermined number of the sequence of images, and automatic selection of an image based on one or more parameters (e.g., exposure, image quality parameter) as described below.

Some embodiments of the present technology include continuously capturing images with the image-capturing device, storing a predetermined number (e.g., 2, 3, 4, 5) of the sequence of images in a buffer. For example, a new image is captured and stored in the buffer at a certain rate (e.g., $\frac{1}{15}$ of a second). Exemplary methods can also include continuously purging or replacing other images in the buffer that were previously captured prior to the sequence of images, displaying the continuously captured images.

Some embodiments of the present technology also involve automatically selecting one of the sequence of images based on an exposure time and optionally an image quality parameter (e.g., image contrast). Alternatively, the selection can be based only on the image quality parameter. Selected images can be stored in memory.

The sequence of images are advantageously captured just prior to the processing logic receiving the user request for the photograph to avoid camera shake associated with the user request (e.g., pressing a shutter button, touching a touchscreen). In some embodiments, the sequence of images does not include images captured after receiving the user request. The sequence of images may also include images captured before receiving the user request and at approximately the time of receiving the user request. Also, the sequence of images may include images captured before, during, and/or after receiving the user request.

A device can enter a mode of taking a sequence of images upon an operator making contact with a shutter button and holding the button down for a predetermined period of time, e.g. four hundred milliseconds. Once the shutter button is held down for the predetermined period of time, the device can begin capturing a sequence of images at a given frame rate, e.g. ten frames per second. However, using the predetermined time delay before initiating image capture results in time that could be used to capture a scene. This can be especially troublesome when trying to capture a fleeting moment.

Accordingly, some embodiments of the present technology involve beginning media capture immediately upon the shutter button being pressed and later determining how to treat those media items based on whether or not the button remains pressed for the threshold period of time. For example, media capture can begin immediately when a finger touches the shutter button and the device can capture frames into memory. If the button is released before the pre-determined period, then the frames are thrown away and a new frame is captured. Conversely, if the button is not released before the pre-determined period, then the device keeps the frames and captures an additional sequence of images.

In some embodiments, the methods, systems, and apparatuses of the present disclosure can be implemented in various devices including electronic devices, consumer devices, data processing systems, desktop computers, portable computers, wireless devices, cellular devices, tablet devices, handheld devices, multi touch devices, multi touch data processing systems, any combination of these devices, or other like devices.

Figure 11:
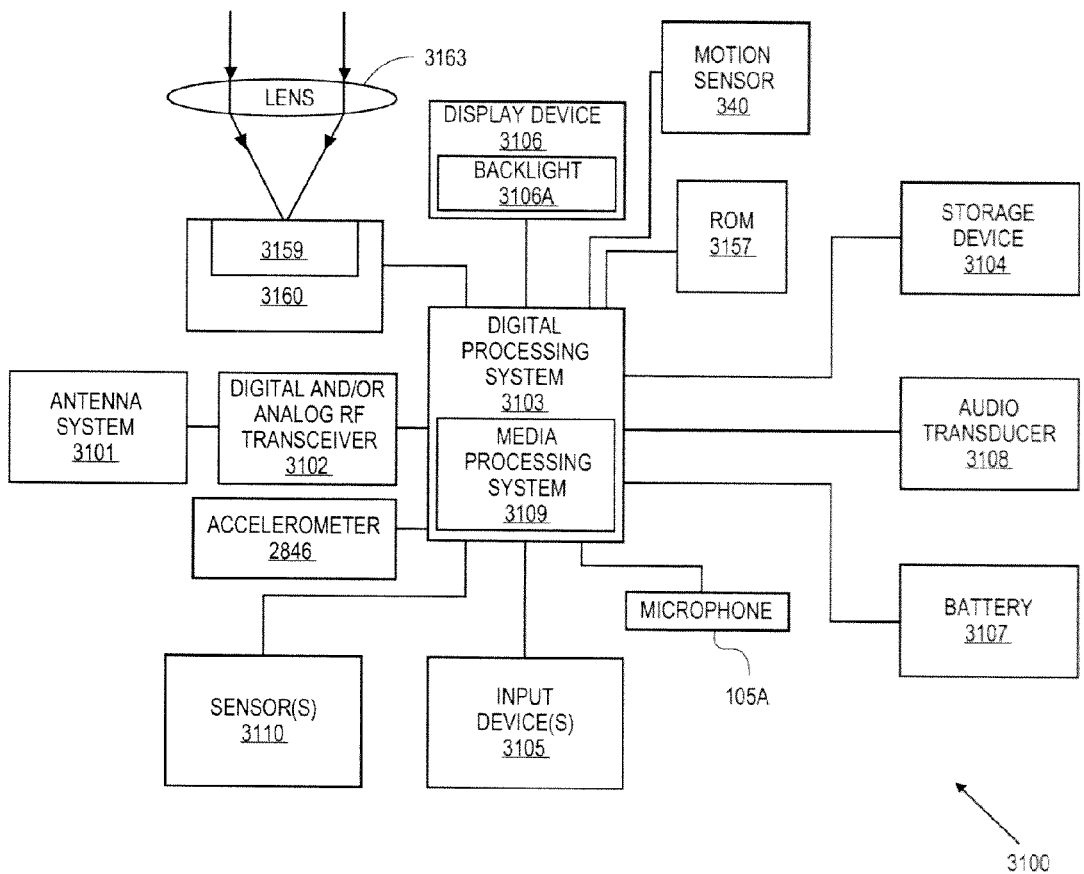
FIG. 11 shows an exemplary wireless image-capturing device.

FIG. 11 shows an exemplary image-capturing device which includes the capability for wireless communication and for capturing images. Wireless device 3100 may include an antenna system 3101. Wireless device 3100 may also include a digital and/or analog radio frequency (RF) transceiver 3102, coupled to the antenna system 3101, to transmit and/or receive voice, digital data and/or media signals through antenna system 3101.

Wireless device 3100 may also include a digital processing system 3103 to control the digital RF transceiver and to manage the voice, digital data and/or media signals. Digital processing system 3103 may be a general purpose processing system, such as a microprocessor or controller for example. Digital processing system 3103 may also be a special purpose processing system, such as an ASIC (application specific integrated circuit), FPGA (field-programmable gate array) or DSP (digital signal processor). Digital processing system 3103 may also include other devices, as are known in the art, to interface with other components of wireless device 3100. For example, digital processing system 3103 may include analog-to-digital and digital-to-analog converters to interface with other components of wireless device 3100. Digital processing system 3103 may include a media processing system 3109, which may also include a general purpose or special purpose processing system to manage media, such as files of audio data.

Wireless device 3100 may also include a storage device 3104, coupled to the digital processing system, to store data and/or operating programs and capture images for the Wireless device 3100. Storage device 3104 may be, for example, any type of solid-state or magnetic memory device. Storage device 3104 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

Wireless device 3100 may also include one or more input devices 3105, coupled to the digital processing system 3103, to accept user inputs (e.g., telephone numbers, names, addresses, media selections, etc.) Input device 3105 may be, for example, one or more of a keypad, a touchpad, a touch screen, a pointing device in combination with a display device or similar input device.

Wireless device 3100 may also include at least one display device 3106, coupled to the digital processing system 3103, to display information such as messages, telephone call information, contact information, pictures, images, movies and/or titles or other indicators of media being selected via the input device 3105. Display device 3106 may be, for example, an LCD display device. In one embodiment, display device 3106 and input device 3105 may be integrated together in the same device (e.g., a touch screen LCD such as a multi-touch input panel which is integrated with a display device, such as an LCD display device). The display device 3106 may include a backlight 3106A to illuminate the display device 3106 under certain circumstances. It will be appreciated that the wireless device 3100 may include multiple displays.

Wireless device 3100 may also include a battery 3107 to supply operating power to components of the system including digital RF transceiver 3102, digital processing system 3103, storage device 3104, input device 3105, microphone 3105A, audio transducer 3108, media processing system 3109, sensor(s) 3110, and display device 3106, and an image sensor 3159 (e.g., CCD (Charge Coupled Device), CMOS based device). The image sensor may be integrated with an image processing unit 3160. The display device 3106 may include a Liquid Crystal Display (LCD) which may be used to display images which are captured or recorded by the wireless image-capturing device 3100. The LCD serves as a viewfinder of a camera and there may optionally be other types of image display devices on device 3100 which can serve as a viewfinder.

The device 3100 also includes an imaging lens 3163 which can be disposed over image sensor 3159. The processing system 3103 controls the operation of the device 3100; and, it may do so by executing a software program stored in ROM 3157, or in the processing system 3103, or in both ROM 3157 and the processing system 3103.

The processing system 3103 controls the image processing operation; and, it controls the storage of a captured image in storage device 3104. The processing system 3103 also controls the exporting of image data (which may or may not be color corrected) to an external general purpose computer or special purpose computer.

The processing system 3103 also responds to user commands (e.g., a command to "take" a picture or capture video by capturing image(s) on the image sensor and storing the image(s) in memory or a command to select an option for contrast enhancement and color balance adjustment).

The ROM 3157 may store software instructions for execution by the processing system 3103 to enter an image capture mode, continuously capture and display images, continuously store the sequence of images in a buffer, automatically select one of the buffered images, and automatically display the selected image. The storage device 3104 is used to store captured/recorded images which are received from the image sensor 3159. It will be appreciated that other alternative architectures of a camera can be used with the various embodiments of the invention.

Battery 3107 may be, for example, a rechargeable or non-rechargeable lithium or nickel metal hydride battery. Wireless device 3100 may also include audio transducers 3108, which may include one or more speakers, and at least one microphone 3105A, an accelerometer 2846, and a motion sensor 340 (e.g., an accelerometer, a gyroscope, a motion detector, a tilt sensor such as mercury switch, a compass, or any combination thereof) to determine motion information for the device. The processing system is configured to determine whether the device is moving based on the motion information.

In some embodiments, the image-capturing device 3100 includes the storage device 3104 to store captured images, the lens 3163 to receive incident light associated with an image to be captured, and the processing system 3103 coupled to the storage device 3104 and the lens 3163. The device also includes a display device 3106 coupled to the storage device 3104. The display device can display the captured images.

The processing system 3103 can be configured, after entry into a mode, to continuously capture images, to store a predetermined number of the sequence of images in a buffer, to receive a user request to capture an image, and in response to the user request, automatically selecting one of the buffered images based on an image contrast parameter that compares pixel values within each buffered image. In an embodiment, the buffer may be located in the system 3100 or in the unit 3160. The sequence of images may be captured just prior to receiving the user request. The processing system 3103 while automatically selecting one of the buffered images based on the image contrast parameter is further configured to determine a focus score for a focus area of each buffered image.

The processing system 3103 also can be configured to automatically select one of the buffered images which were all captured prior to receiving the user request. In an embodiment, the sequence of images can include only images captured just prior to receiving the user request to take a photograph. In one embodiment, the sequence of images stored in the storage device can include the three images captured by the image-capturing device just prior to receiving the user request.

In some embodiments of the present disclosure, the wireless device 3100 can be used to implement at least some of the methods discussed in the present disclosure.

Figure 12A:
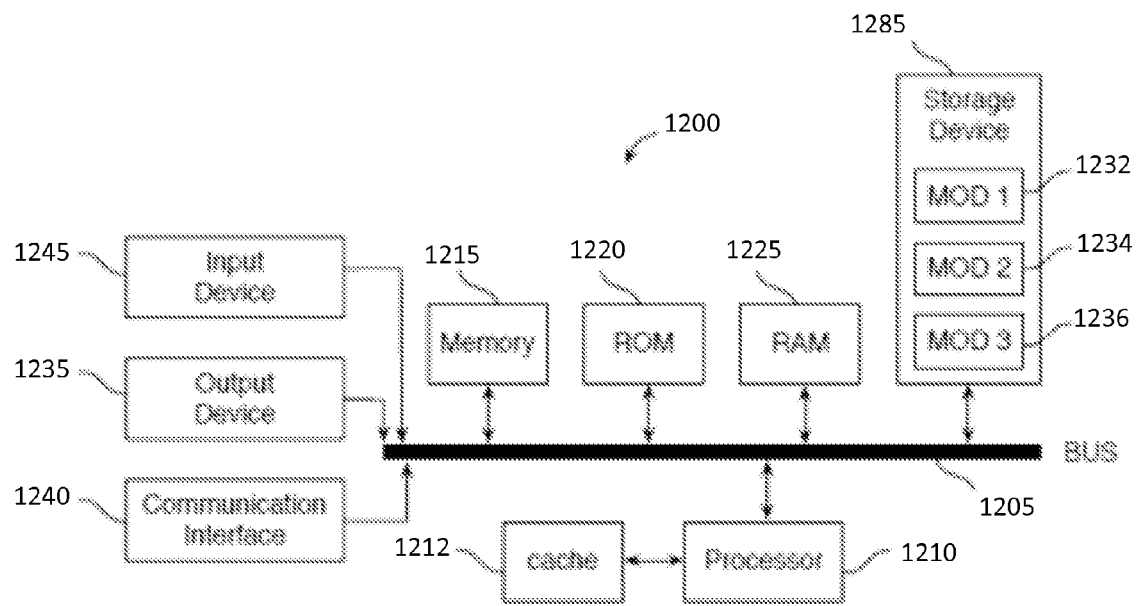
FIG. 12A and FIG. 12B illustrate exemplary possible system embodiments.
Figure 12B:
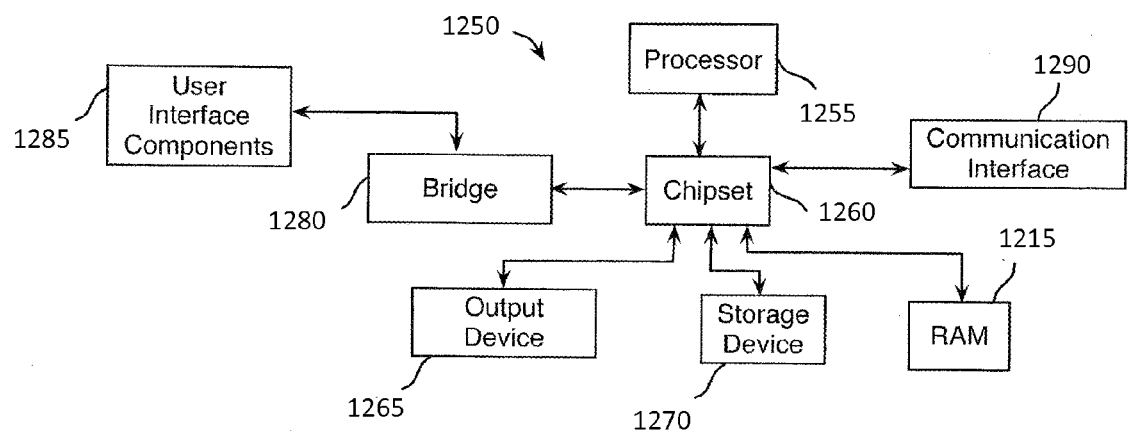

FIG. 12A and FIG. 12B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 12A illustrates a conventional system bus computing system architecture 1200 wherein the components of the system are in electrical communication with each other using a bus 1205. Exemplary system 1200 includes a processing unit (CPU or processor) 1210 and a system bus 1205 that couples various system components including the system memory 1215, such as read only memory (ROM) 1220 and random access memory (RAM) 1225, to the processor 1210. The system 1200 can include a cache of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general purpose processor and a hardware module or software module, such as module 1 1232, module 2 1234, and module 3 1236 stored in storage device 1230, configured to control the processor 1210 as well as a special-purpose processor where software instructions are incorporated into the actual processor design. The processor 1210 may essentially be a completely self-contained computing system, containing multiple cores or processors, a bus, memory controller, cache, etc. A multi-core processor may be symmetric or asymmetric.

To enable user interaction with the computing device 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the computing device 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof.

The storage device 1230 can include software modules 1232, 1234, 1236 for controlling the processor 1210. Other hardware or software modules are contemplated. The storage device 1230 can be connected to the system bus 1205. In one aspect, a hardware module that performs a particular function can include the software component stored in a computer-readable medium in connection with the necessary hardware components, such as the processor 1210, bus 1205, display 1235, and so forth, to carry out the function.

FIG. 12B illustrates a computer system 1250 having a chipset architecture that can be used in executing the described method and generating and displaying a graphical user interface (GUI). Computer system 1250 is an example of computer hardware, software, and firmware that can be used to implement the disclosed technology. System 1250 can include a processor 1255, representative of any number of physically and/or logically distinct resources capable of executing software, firmware, and hardware configured to perform identified computations. Processor 1255 can communicate with a chipset 1260 that can control input to and output from processor 1255. In this example, chipset 1260 outputs information to output 1265, such as a display, and can read and write information to storage device 1270, which can include magnetic media, and solid state media, for example. Chipset 1260 can also read data from and write data to RAM 1275. A bridge 1280 for interfacing with a variety of user interface components 1285 can be provided for interfacing with chipset 1260. Such user interface components 1285 can include a keyboard, a microphone, touch detection and processing circuitry, a pointing device, such as a mouse, and so on. In general, inputs to system 1250 can come from any of a variety of sources, machine generated and/or human generated.

Chipset 1260 can also interface with one or more communication interfaces 1290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1255 analyzing data stored in storage 1270 or 1275. Further, the machine can receive inputs from a user via user interface components 1285 and execute appropriate functions, such as browsing functions by interpreting these inputs using processor 1255.

It can be appreciated that exemplary systems 1200 and 1250 can have more than one processor 1210 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
    displaying, on a media capture device having a display, a scene to be captured upon the expiration of a counter;
    displaying the counter in the scene;
    detecting, by a media processing system in the media capture device, a recognized object in the scene;
    detecting, by the media processing system, that the recognized object has been at least partially obscured; and
    suspending the countdown of the timer based on the detection of the obscured recognized object.

2. The computer-implemented method of claim 1, further comprising:
    increasing, by a processor, a level of contrast between the counter and the displayed scene as the counter approaches expiration.

3. The computer-implemented method of claim 2, wherein increasing the level of contrast between the counter and the displayed scene comprises:
    decreasing the brightness of the displayed scene as the counter approaches expiration; and
    increasing the brightness of the counter as the counter approaches expiration.

4. The computer-implemented method of claim 2, wherein increasing the level of contrast between the counter and the displayed scene comprises:
    increasing a level of transparency of the displayed scene as the counter approaches expiration; and
    increasing a level of opacity of the counter as the counter approaches expiration.

5. The computer-implemented method of claim 1, further comprising:
    determining a distance of the object; and
    adjusting the size of the counter based on whether the object is determined to be closer or further than a predetermined threshold distance.

6. The computer-implemented method of claim 5, further comprising:
    adjusting a position of the counter in the scene based on whether the object is determined to be closer or further than a predetermined threshold distance.

7. The computer-implemented method of claim 5, further comprising automatically triggering a countdown of the counter after detecting the object recognized in the scene.

8. The computer-implemented method of claim 5, wherein the object recognized in the scene comprises a face.

9. The computer-implemented method of claim 1, further comprising:
    detecting that the recognized object in no longer obscured; and
    restarting the countdown of the timer based on the detection that the recognized object is no longer obscured.

10. The computer-implemented method of claim 1, further comprising:
    detecting that the recognized object in no longer; and
    resuming the countdown of the timer based on the detection that the recognized object is no longer obscured.

11. The computer-implemented method of claim 1, further comprising:
    capturing a sequence of images over a time related to the expiration of the counter;
    storing the sequence of images in a buffer;
    selecting, by a media processing system in the media capture device, an image from the sequence of images stored in the buffer based on an image quality parameter; and
    displayed the selected image on a display of the media capture device.

12. The computer-implemented method of claim 11, wherein the time related to the expiration of the counter comprises a period beginning a predetermined time prior to the expiration of the counter and ending a predetermined period after the expiration of the counter.

13. An electronic media capture device comprising:
    a display;
    a lens for receiving incident light associated with a series of image frames of a scene to be captured;
    an image sensor configured to convert the incident light into an electrical signal;
    a media processor configured to receive the electrical signal and cause the display to:
        display a digital representation of the scene to be captured upon the expiration of a counter;
        display the counter in the scene;
        detect a recognized object in the scene;
        detect that the recognized object has been at least partially obscured; and
        suspend the countdown of the timer based on the detection of the obscured recognized object.

14. The electronic media capture device of claim 13, wherein the media processor is further configured to:
    determine a distance of the object; and
    adjust the size of the counter based on whether the object is determined to be closer or further than a predetermined threshold distance.

15. The electronic media capture device of claim 14, wherein the media processor is further configured to adjust a position of the counter in the scene based on whether the object is determined to be closer or further than a predetermined threshold distance.

16. The electronic media capture device of claim 13, wherein the image sensor further is further configured to capture a sequence of images over a time that is related to the expiration of the counter, and wherein the image sensor further is further configured to:
    store the sequence of images in a buffer;
    select an image from the sequence of images stored in the buffer based on an image quality parameter; and
    cause the display of the selected image on the display.

17. The electronic media capture device of claim 16, wherein the time related to the expiration of the counter comprises a period beginning a predetermined time prior to the expiration of the counter and ending a predetermined period after the expiration of the counter.

18. The electronic media capture device of claim 13, wherein the media processor is further configured to increase a level of contrast between the counter and the displayed scene as the counter approaches expiration.

19. A non-transitory computer-readable storage medium comprising:
- a medium configured to store computer-readable instructions thereon; and
- the computer-readable instructions that, when executed by a processing device cause the processing device to perform a method, comprising:
  - displaying, on a media capture device having a display, a scene to be captured upon the expiration of a counter;
  - displaying the counter in the scene;
  - detecting, by a media processing system in the media capture device, a recognized object in the scene;
  - detecting, by the media processing system, that the recognized object has been at least partially obscured; and
  - suspending the countdown of the timer based on the detection of the obscured recognized object.

20. The non-transitory computer-readable storage medium of claim 19, wherein the instructions cause the processing device to further perform:
- determining a distance of the object;
- adjusting the size of the counter based on whether the object is determined to be closer or further than a predetermined threshold distance;
- adjusting a position of the counter in the scene based on whether the object is determined to be closer or further than a predetermined threshold distance; and
- increasing, by a processor, a level of contrast between the counter and the displayed scene as the counter approaches expiration.

* * * * *